US006246233B1

(12) United States Patent
Griffen et al.

(10) Patent No.: US 6,246,233 B1
(45) Date of Patent: Jun. 12, 2001

(54) MAGNETORESISTIVE SENSOR WITH REDUCED OUTPUT SIGNAL JITTER AND TEMPERATURE COMPENSATION

(75) Inventors: Neil C. Griffen; Richard S. Stokes, both of Westerville, OH (US)

(73) Assignee: NorthStar Technologies Inc., Westerville, OH (US)

( * ) Notice: Subject to any disclaimer, the term of this patent is extended or adjusted under 35 U.S.C. 154(b) by 0 days.

(21) Appl. No.: 08/863,339

(22) Filed: May 27, 1997

Related U.S. Application Data

(63) Continuation-in-part of application No. 08/366,580, filed on Dec. 30, 1994, now Pat. No. 5,680,042.

(51) Int. Cl.[7] .............................. G01B 7/30; G01B 7/14
(52) U.S. Cl. .............................. 324/207.21; 324/207.25; 324/207.12
(58) Field of Search .................... 324/207.21, 207.22, 324/207.25, 173, 174, 252, 207.12, 207.24, 225; 338/32 R; 327/510; 33/706, 708

(56) References Cited

U.S. PATENT DOCUMENTS

| | | |
|---|---|---|
| 3,058,339 | 10/1962 | Shapiro . |
| 3,143,882 | 8/1964 | Brueckner . |
| 3,436,655 | 4/1969 | Lundgreen . |
| 3,636,767 | 1/1972 | Duffy . |

(List continued on next page.)

OTHER PUBLICATIONS

Data Sheet, Gurley Precision Instruments, Series 835H Hollow Shaft Encoders (Jan. 1994 or prior).

"Introduction to Encoders & Accessories, Excellence in Digital Measurements . . . ," *Dynapar/Veeder–Root*, Sep. 1991.

Avtron Manufacturing, Inc. brochure, "Rotary Pulse Generators," Mar. 1991.

Wehmer, B.F., *Electromagnetic Tachometer*, IBM Tech. Discl. Bull. vol. 11, No. 7, Dec. 1968, pp. 746, 747.

Schartz, Lisa et al., "Rotary Optical Encoding Using An Integrated Sensor Array," 1992 Analog & Mixed–Signal Design Conference, Burlingame, CA, Oct. 28–30, 1992, 18 pages.

Li, Zhixin, "Performance enhancement of optical encoders for rotary laser beam scanners," *Micro–Optics/Micromechanics and Laser Scanning and Shaping, Proceedings SPIE—The International Society for Optical Engineering*, vol. 2383, San Jose California, Feb. 7–9, 1995, pp. 366–380.

Campbell, P., "Magnetic Rotary Position Encoders With Magneto–Resistive Sensors," *IEEE Fourth International Conference on Electrical Machines and Drives*, Conference Publication No. 310, London, England, pp. 359–363 (Sep. 13, 1989).

Retberg, Arthur L., et al., "Optical Encoders Keep An Eye On Shaft Motion," *Power Transmission Design*, Mar. 1991, pp. 57–60.

(List continued on next page.)

*Primary Examiner*—Jay Patidar
(74) *Attorney, Agent, or Firm*—Nixon & Vanderhye P.C.

(57) ABSTRACT

A magnetoresistive sensor for use in a rotary encoder with a drum having a circumference covered with a magnetic track at a predetermined pitch includes a plurality of magnetoresistive elements positioned opposite the drum and connected in a bridge circuit such that when the drum rotates an output signal from the bridge indicates a rotary angle of the drum. The magnetoresistive elements include one or more complementary pairs of elements positioned 180° out of phase. Each of such pair of complementary magnetoresistive elements is connected in one leg of a bridge circuit such that jitter effects caused by asymmetric magnetic fields and physical differences between sensor elements are cancelled. Magnetoresistive sensor element configurations for minimizing the impact of temperature gradients across the magnetoresistive sensor are also disclosed.

56 Claims, 14 Drawing Sheets

U.S. PATENT DOCUMENTS

| | | |
|---|---|---|
| 3,764,888 | 10/1973 | Anderson . |
| 3,800,718 | 4/1974 | Johnson . |
| 3,814,934 | 6/1974 | Mesh et al. . |
| 3,997,782 | 12/1976 | Willits . |
| 4,199,719 | 4/1980 | Grob . |
| 4,274,053 | 6/1981 | Ito et al. . |
| 4,298,948 | 11/1981 | Davis . |
| 4,319,188 | 3/1982 | Ito et al. . |
| 4,350,952 | 9/1982 | Holt et al. . |
| 4,383,303 | 5/1983 | Hoffman . |
| 4,418,372 | 11/1983 | Hayashida et al. . |
| 4,429,276 * | 1/1984 | Narimatsu et al. .................. 324/252 |
| 4,506,217 | 3/1985 | Rothley et al. . |
| 4,578,624 * | 3/1986 | Neki et al. ......................... 338/32 R |
| 4,594,548 | 6/1986 | Takahashi et al. ............. 324/207.21 |
| 4,628,259 | 12/1986 | Takahashi et al. ............. 324/207.21 |
| 4,639,807 | 1/1987 | Sekizawa et al. . |
| 4,642,496 | 2/1987 | Kerviel et al. . |
| 4,656,377 | 4/1987 | Akiyama et al. . |
| 4,668,913 | 5/1987 | Vinal . |
| 4,686,472 | 8/1987 | Van Ooijen et al. . |
| 4,703,378 * | 10/1987 | Imakoshi et al. ...................... 360/66 |
| 4,712,064 | 12/1987 | Eckardt et al. . |
| 4,742,297 | 5/1988 | Heaton et al. . |
| 4,766,376 | 8/1988 | Takahashi et al. . |
| 4,786,870 | 11/1988 | Kawamata et al. . |
| 4,800,457 | 1/1989 | Kryder et al. . |
| 4,810,953 | 3/1989 | Huynh . |
| 4,816,948 | 3/1989 | Kamo et al. . |
| 4,818,939 | 4/1989 | Takahashi et al. ............. 324/207.21 |
| 4,821,012 | 4/1989 | Kamo et al. ........................ 338/32 R |
| 4,851,771 | 7/1989 | Ikeda et al. . |
| 4,853,631 | 8/1989 | Carmen . |
| 4,853,632 | 8/1989 | Nagano et al. . |
| 4,857,841 | 8/1989 | Hastings et al. . |
| 4,866,382 | 9/1989 | Carmen . |
| 4,874,053 | 10/1989 | Kimura et al. . |
| 4,890,059 | 12/1989 | Guentner . |
| 4,907,445 | 3/1990 | Okumura . |
| 4,914,387 | 4/1990 | Santos . |
| 4,914,389 | 4/1990 | Juds . |
| 4,922,197 | 5/1990 | Juds et al. . |
| 4,975,675 | 12/1990 | Becker . |
| 4,988,220 | 1/1991 | Christiansen et al. . |
| 4,992,733 | 2/1991 | Griebeler . |
| 5,019,776 | 5/1991 | Kawamata et al. .................. 324/252 |
| 5,041,784 | 8/1991 | Griebler . |
| 5,043,660 | 8/1991 | Hasegawa ...................... 324/207.25 |
| 5,047,716 | 9/1991 | Katagiri ......................... 324/207.21 |
| 5,081,416 | 1/1992 | La Croix . |
| 5,084,674 | 1/1992 | Lachmann et al. .................. 324/174 |
| 5,216,363 | 6/1993 | Masaaki .......................... 324/207.21 |
| 5,231,597 | 7/1993 | Komatsu . |
| 5,243,280 | 9/1993 | Kusumi ........................... 324/207.21 |
| 5,293,125 | 3/1994 | Griffen et al. ...................... 324/173 |
| 5,386,642 | 2/1995 | Spies et al. ..................... 324/207.21 |
| 5,422,569 | 6/1995 | Nakahara et al. ................... 324/174 |
| 5,430,374 | 7/1995 | Metz ............................... 324/207.21 |
| 5,654,633 | 8/1997 | Griffen et al. . |

OTHER PUBLICATIONS

Kikuchi, Y., et al., "Consideration for a High Resolution of Magnetic Rotary Encoder,"*IEEE Transactions On Magnetics*, vol. 32, No. 5, Sep. 1996, pp. 4959–4961.

Engelhardt, K., et al., High–resolution position encoder, insensitive to misalignment, Micro–Optical Technologies for Measurement, Sensors, and Microsystems, *SPIE* vol. 2783, Jun. 12–13, 1996, Besancon, France, pp. 184–191.

Campbell, P., "Magnetoresistive sensors for rotary position encoders," *INTERMAG '90—International Magnetics Conference 9020112*, Brighton, UK, Mar. 1990, pp. 17–20 copy of this document to follow.

* cited by examiner

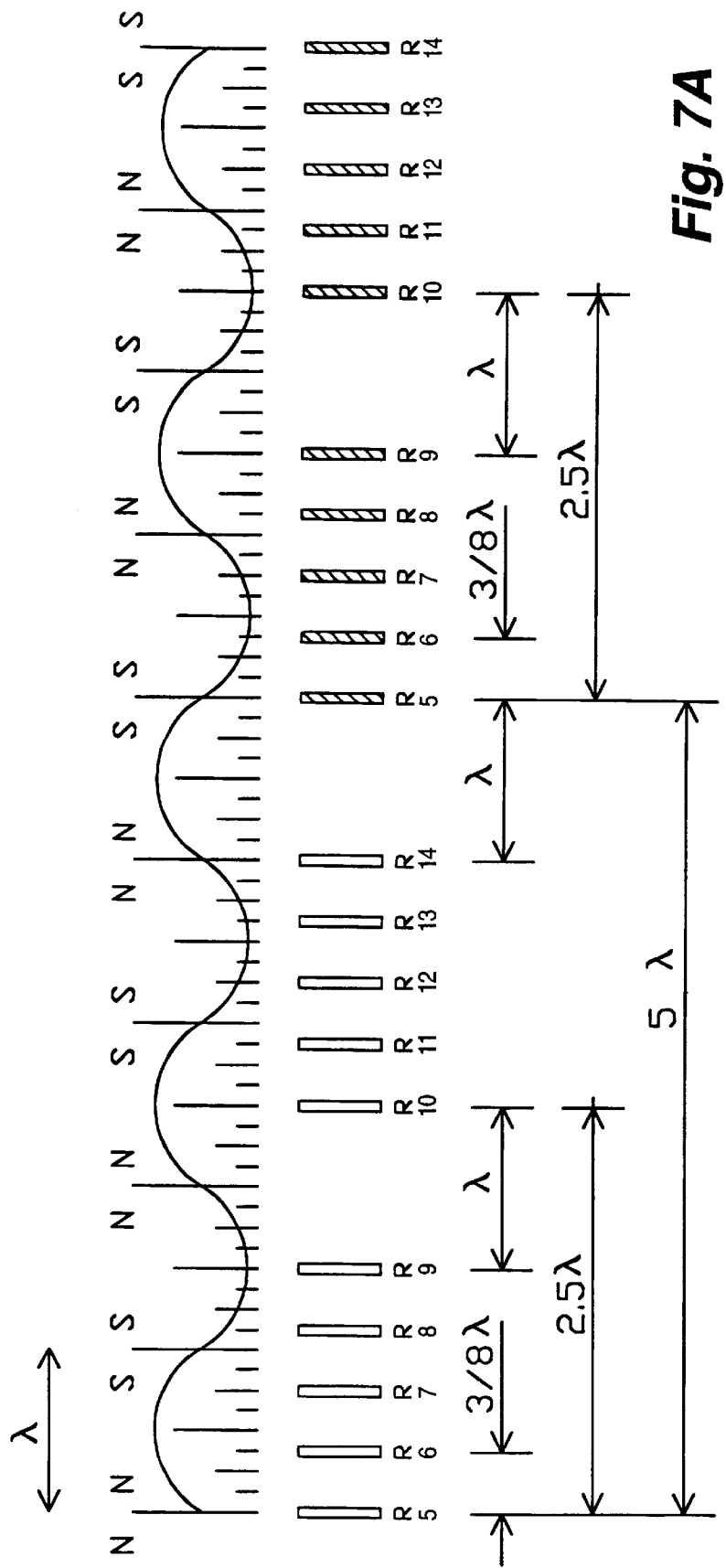

MAGNETORESISTIVE SENSOR WITH REDUCED OUTPUT SIGNAL JITTER AND TEMPERATURE COMPENSATION

RELATED APPLICATIONS

This is a continuation-in-part of U.S. patent application Ser. No. 08/366,580, filed on Dec. 30, 1994, now U.S. Pat. No. 5,680,042, granted on Oct. 21, 1997.

FIELD OF THE INVENTION

The present invention relates to a magnetoresistive sensor that finds particular application in rotating shaft encoders. In particular, the magnetoresistive sensor reduces jitter in the output signal created by asymmetries in sensed magnetic fields.

BACKGROUND AND SUMMARY OF THE INVENTION

Magnetoresistive sensors are based on the principle that the resistance of a ferromagnetic material changes when subjected to a magnetic flux. Magnetoresistive sensors have numerous applications including ascertaining shaft rotation parameters (position, acceleration, etc.) in the context of encoders, tachometers, etc. In this regard, U.S. Pat. No. 5,293,125 entitled "Self Aligning Tachometer With Interchangeable Elements For Different Resolution Outputs" assigned to the present assignee is incorporated herein by reference. In these applications, magnetoresistive sensors detect changes in magnetic fields to measure motion.

FIG. 1 shows one application of the present embodiment in which a magnetic drum 100 includes a peripheral surface 112 having two distinct tracks: an incremental or INC track 116 and an index or Z track 118. The rotary drum 100 is mounted to a shaft 114 which may be connected for example to a motor (not shown). The INC track 116 provides pulses indicating incremental shaft rotation and comprises an alternating series of magnetic north and south poles magnetically imprinted on the drum periphery 112 at a predetermined pitch which may be on the order of hundreds of microns, (e.g., 747 microns in the preferred embodiment). Depending on the diameter of the drum 100, the peripheral surface 112 may encode a large number of pulses per revolution, (e.g., 480, 512, 600, etc.) The Z track 118 is used to generate one output pulse per revolution of the drum and thus provides information concerning the number of shaft revolutions and the absolute shaft position. Accordingly, whenever a Z pulse is generated, the motor shaft is known to be at a particular absolute position relative to the magnetoresistive sensor module 120.

Magnetoresistive sensor module 120 and 120' include a plurality of magnetoresistive elements positioned adjacent to and separated by a predetermined gap from the drum peripheral surface 112 as will be described in more detail below. The magnetoresistive INC track 116 has corresponding sensor module 120, and the Z track 118 has corresponding sensor module 120'. Both sensor modules 120 and 120' are connected to signal sensing and conditioning circuitry 122.

Each of the magnetoresistive sensors 120, 120' consists of a glass, ceramic, or silicon substrate covered with a thin film permaloy, e.g., a Ni—Fe film, which is photoetched into a pattern of individual elements which are connected to the sensing and signal conditioning circuitry 122 via one or more flexible leads. Reference is made to FIG. 2(a) which is a perspective view of a portion of the magnetized INC track 116 showing the adjacent north and south poles (N, S) on its incremental track and plural magnetoresistive elements 124 including elements $MR_1$ and $MR_2$ with connecting nodes A, B, and C, a dc voltage being connected to nodes A and B. As can be seen from the drawing, the magnetoresistive elements are formed parallel to each other and to the north and south poles formed on the peripheral surface of the drum 112. The magnetoresistive elements are typically spaced some fraction of the pitch distance separating each adjacent magnetic pole, e.g. $\lambda/2$ in FIG. 2(a).

FIG. 2(b) shows a current i generated in a linear magnetoresistive strip in response to an orthogonal magnetic field H. As shown in FIG. 2(c), the magnetoresistive strip experiences a drop in electrical resistance R (corresponding to an increase in current i) in the presence of the saturated magnetic field H. More specifically, the electrical resistance R of the thin film magnetoresistive pattern inversely varies in accordance with the strength of magnetic field H which intersects a perpendicular current i running through the magnetoresistive pattern as shown. In theory, the change in resistance R is independent of the polarity of the magnetic field H. However, as will be described in more detail below, this assumption is not reliable in practical magnetoresistive sensor applications.

Referring to FIG. 2(d), the magnetoresistive sensor elements $MR_1$ and $MR_2$ are conventionally connected in a resistive bridge array so as to provide differential outputs, e.g., the output signal is taken from node C. Note as the drum 100 rotates the magnetic pole pattern on INC track 116 past the magnetoresistive sensor elements $MR_1$ and $MR_2$, an AC output generated at bridge circuit node C corresponds to the movement of the magnetic pole pattern and therefore the rotation of the drum 100.

Magnetoresistive sensors are designed to increase the output voltage level and to improve the temperature properties of the device by making bridge connections between several elements. Two phase outputs (i.e., A and B phases) are typically obtained from the sensor by offsetting the magnetoresistive sensor's pattern of elements from the north-south pole pattern on the INC track 116 of the magnetic drum 100 by one quarter of the pole pitch $\lambda$. FIG. 3 illustrates a simple configuration of magnetic resistive elements $a_1$, $b_1$, $a_2$, and $b_2$ positioned parallel to and above the magnetic pole surface corresponding magnetic field lines between four adjacent poles. One phase or channel of a magnetoresistive sensor comprises two magnetoresistive strips displaced an odd multiple of a half pole pitch $\lambda$ from each other which in the layout in FIG. 3 is $3\lambda/2$. As the drum 100 rotates one pole pitch $\lambda$, the one channel sensor output (which can be assumed for simplicity to be an approximately sinusoidal output waveform) completes one cycle having a particular phase A. A quadrature signal (phase B) which is 90° out of phase from phase A is generated by the B channel magnetoresistive sensor elements B1 and B2 which are formed on the same substrate as elements A1 and A2 but displaced an odd multiple of a quarter pole pitch from the first pair A1, A2.

The phase A and phase B bridge outputs are typically amplified and converted into square waveforms using conventional comparators or other zero crossing detection methods. The square waveforms for phases A ($\theta_A$) and B ($\theta_B$) shown in FIG. 4 are in a quadrature relationship, i.e. $\theta_A$ leads $\theta_B$ by 90°. By combining the two quadrature phases $\theta_A$ and $\theta_B$ in an exclusive-OR gate, a single channel output of twice the frequency of the quadrature signals is obtained. This means that the output resolution of the magnetoresistive sensor is "doubled" without any increase in the number of magnetized poles formed on the rotary drum peripheral surface. Such sensors are referred to as frequency doubling sensors and achieve higher resolution without having to increase the manufacturing accuracy that would otherwise be required to reduce the separation between the poles needed to achieve higher resolution. In theory, additional exclusive-OR outputs may be recombined using further exclusive OR-gates to produce even higher resolutions by frequency tripling, quadrupling, etc. Although the present invention may be applied to frequency tripling, quadrupling, etc. embodiments, the present invention is described in the context of a frequency doubling sensor for the sake of simplicity.

A frequency doubling magnetoresistive sensor is shown in FIG. 5. The magnetoresistive sensor includes two sets of five magnetoresistive elements, the first set including elements 5–9 and second set including elements 10–14. The first and second sets of magnetoresistive elements are separated by one magnetic pole pitch $\lambda$. Each magnetoresistive element within a group is spaced by some fraction of the pitch, e.g., by $3\lambda/8$. Magnetoresistive elements 5–9 are connected to power supply Vcc which may be for example 5 volts. The other terminals of magnetoresistive elements 5–9 are connected to output terminals A–E and to terminals of corresponding magnetoresistive elements 10–14 from the second set. The other terminal of magnetoresistive elements 10–14 is connected to ground.

The bridge circuit schematic formed by the magnetoresistive sensor shown in FIG. 5 is illustrated in FIG. 6. Note that the magnetic field H generated by the magnetic poles formed on the drum shown in FIG. 5 is approximated as a sinusoid and assumes that the magnitude of all positive magnetic fields are identical to each other and all negative fields are identical to each other. If it could be further assumed that the positive field has the same magnitude as the negative field and that therefore the negative and positive fields are symmetric, the bridge outputs A-E could be combined to generate a frequency doubled square wave output having a constant period T. In other words, if it could be assumed that the magnetic fields generated from the magnetic pole drum pattern are uniform in magnitude and from pole to pole, the square wave output would be completely uniform.

In practice, the magnetic pole pattern formed on the drum surface is not symmetric, and the positive and negative magnetic fields may have different magnitudes. As a result of the fields generated from the magnetic pattern not repeating exactly from pole to pole, i.e., asymmetries in the detected magnetic field, the square waves generated by the bridge circuit do not have a uniform and constant period. This nonuniformity or variation in the period of the generated square waves is defined as "period jitter" or simply "jitter." More formally, jitter is defined as follows:

$$\text{jitter} = \frac{(\text{maximum period} - \text{minimum period})}{\text{average period}} \times 100\%$$

In this definition, jitter is expressed as a percentage of the average period with 0% corresponding to no jitter.

Current encoders which employ frequency doubling magnetoresistive sensors produce jitter as high as twenty-five percent. However, jitter of less than five percent is desirable. Factors that contribute to the magnetic pole asymmetry that causes jitter include:

Hysteresis or bias of the magnetoresistive sensor material which occurs when the sensor material reaches maximum resistance at some magnetic field intensity other than zero. Sensor bias also occurs when the sensor is more sensitive to a magnetic field having one polarity than to a field of the same magnitude in the opposite pole direction. Film stresses on the sensor are one source of this type of bias.

Variations in the shape of the sensor output signal. Variations in the gap separation between the magnetized drum and the magnetoresistive sensor and third harmonic distortions and imperfections in the magnetized surface cause distortions in the output signal. These are often a function of or related to the direction of the magnetic field.

Misalignment of the sensor with respect to the magnetized pattern, especially the azimuth angle. This causes a distortion in the sensor output that manifests itself in part as a variation in the sensed field.

The present invention substantially reduces jitter in magnetoresistive sensors. A magnetoresistive sensor in accordance with the present invention includes one or more magnetoresistive elements positioned in array of magnetoresistive elements for detecting a changing magnetic field having an alternating polarity caused by relative movement between the magnetoresistive elements and a magnetized pattern wherein the one or more complementary magnetoresistive elements are displaced a distance $\lambda$ or a multiple of $\lambda$ thereby compensating for and substantially cancelling the effects of jitter. This causes the signal output errors induced by error in one field polarity to be compensated for similar but opposite errors in the opposite field polarity. These errors may include asymmetric magnetic fields, individual physical differences between the sensors, sensor bias/hysteresis, distortion, and other nonuniformities are compensated. Each element and its complement are combined in one leg of a bridge circuit where the output of each leg of the bridge circuit produces a waveform having a substantially constant period.

The present invention may be advantageously incorporated into a rotary encoder having a drum with a circumference covered with a magnetic track having a predetermined pitch between magnetic poles and a magnetoresistive sensor. The sensor includes a plurality of magnetoresistive elements positioned opposite the drum and connected in a bridge circuit such that when the drum rotates, an output signal from the bridge indicates a rotary movement of the drum. The magnetoresistive elements include one or more elements positioned at a distance of one $\lambda$ from one or more other corresponding elements.

Specific example embodiments of a frequency doubling sensor array are set forth to detect the motion of a magnetic pattern generated by a moving magnetic source magnetized at a pitch $\lambda$. In one of the example embodiments, a first pair of sensor elements is separated by $2\frac{1}{2}\lambda$ and connected to form a first half-bridge. A second pair of sensor elements is separated by $2\frac{1}{2}\lambda$ and connected to form a second half-bridge with the first sensor element of the first and second pairs being separated by $3\lambda/8$. A third pair of sensor elements is separated by $2\frac{1}{2}\lambda$ and connected to form a third half-bridge. The first sensor element of the third pair is separated by $\frac{3}{8}\lambda$ from the first element in the second pair and by $\frac{3}{4}\lambda$ from the first element in the first pair. A fourth pair of sensor elements is separated by $2\frac{1}{2}\lambda$ and connected to form a fourth half-bridge. The first sensor element of the fourth pair is separated by $\frac{3}{8}\lambda$ from the first sensor element in the third pair and by $\frac{3}{4}\lambda$ from the first element in the second pair. In some embodiments a fifth pair of sensor elements is separated by $2\frac{1}{2}\lambda$ and connected to form a fifth half-bridge. The first sensor element of the fifth pair is separated by $3/8\lambda$ for the sensor element in the fourth pair and by $3/4\lambda$ from the first element in the second pair. Plural complementary sensor elements are also included in the frequency doubling sensor array. Each complementary sensor element is separated by a $\lambda$ from and connected to a corresponding sensor element of the first through fourth or fifth pairs of sensor elements.

Another example embodiment of a frequency doubling sensor array of the present invention has a similar configuration but different sensor element spacing. Pairs of sensor elements are separated by $3\frac{1}{2}\lambda$. Moreover, the first sensor element of the first and second pairs are separated by $5/8\lambda$. The first sensor element of the third pair is separated by $5/8\lambda$ from the first element in the second pair and by $1/4\lambda$ from the first element in the first pair. The first sensor element of the fourth pair is separated by $5/8\lambda$ from the first element in the third pair and by $1\frac{1}{4}\lambda$ from the first sensor element in the second pair. In some embodiments a fifth pair is added such that first sensor element of the fifth pair is separated by $5/8\lambda$ from the first element of the fourth pair and $1/4\lambda$ from the first sensor in the third pair.

In addition, a more generalized frequency doubling magnetoresistive array with appropriate complementary sensor elements is described. General rules for constructing such an array in accordance with various aspects of the present invention are also set forth.

The present invention also advantageously includes various sensor configurations for a frequency doubling/frequency multiplying magnetoresistive sensor that compensate for differences in temperature across the magnetoresistive sensor array. In general, magnetoresistive sensor elements making up a pair of magnetoresistive elements connected to form a corresponding half-bridge are positioned in the magnetoresistive sensor array within close proximity of each other thereby minimizing the effect of temperature differences that often exist across the magnetoresistive sensor array in practical applications. This temperature compensation configuration may be used advantageously (though not necessarily) in magnetoresistive sensor arrays that include jitter-cancelling, complementary sensor elements.

BRIEF DESCRIPTION OF THE DRAWINGS

FIGS. 7A and 7B illustrate a magnetoresistive sensor and corresponding half-bridge circuit in accordance with an example embodiment of the present invention;

DETAILED DESCRIPTION OF THE DRAWINGS

In the following description, for purposes of explanation and not limitation, specific details are set forth, such as particular circuits, circuit components, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 5:
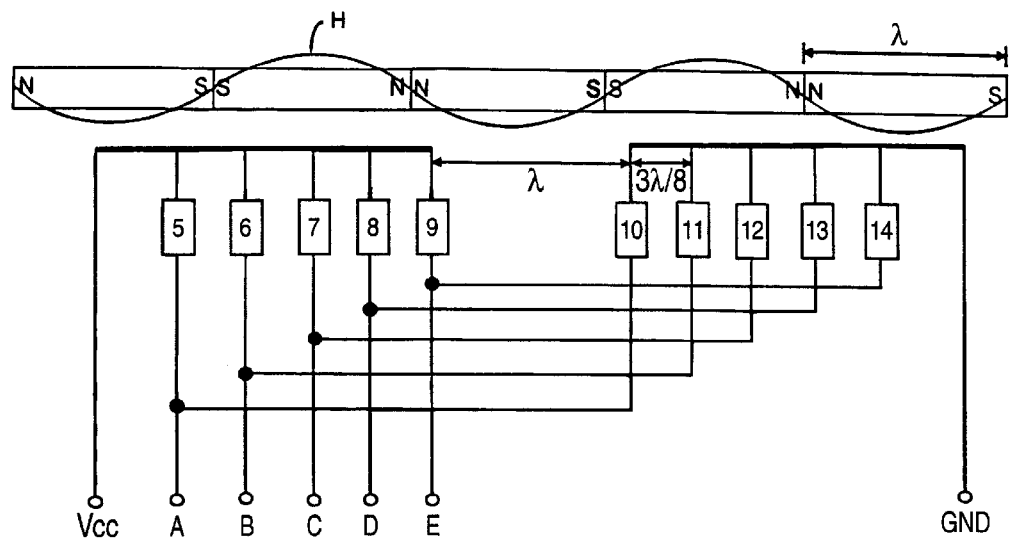
FIG. 5 illustrates the positional relationship of individual magnetoresistive elements provided in a frequency doubling magnetoresistive sensor with respect to the magnetic pole pattern formed on the magnetic drum.
Figure 6:
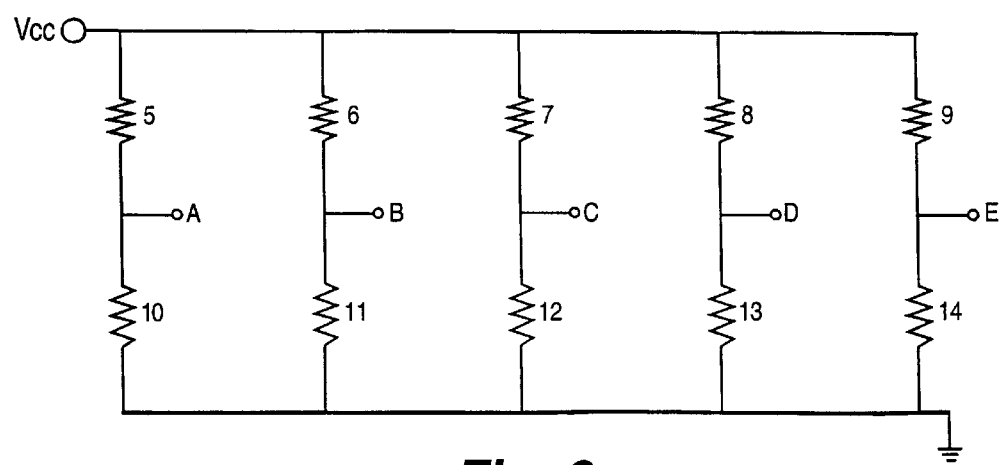
FIG. 6 is a electrical schematic showing the bridge circuit formed by connecting certain ones of the magnetoresistive elements of the magnetoresistive sensor illustrated in FIG. 5.
Figure 7B:
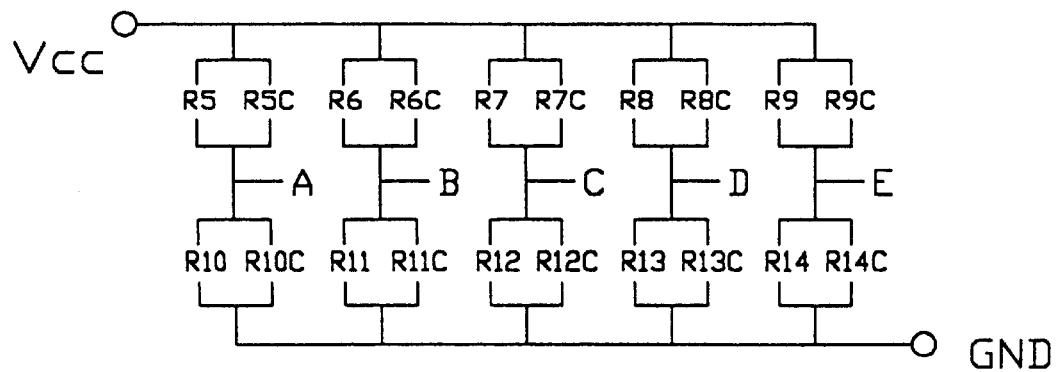

Referring to FIG. 7A, a frequency doubling magnetoresistive sensor design in accordance with an example embodiment of the present invention is illustrated. In contrast to the sensor illustrated in FIG. 5 which includes ten total sensor elements grouped into two sets of five, (i.e., 5–9 and 10–14), this example embodiment of the frequency doubling magnetoresistive sensor according to the present invention includes twice the number of magnetoresistive elements. However, the present invention is not limited to a particular number of elements. The first set of five magnetoresistive elements R5–R9 are connected to a power supply Vcc with each sensor element being separated in this example embodiment by $3/8\lambda$, where $\lambda$ is the spacing between north and south poles and sometimes referred to as the magnetic pole pitch. The sensor elements that form the top and bottom of a bridge circuit connecting the sensor elements are separated by $2.5\lambda$. The last sensor R9 of the first sensor set (R5–R9) is separated from the first sensor R10 of the second set of sensors (R10–R14) by $\lambda$. Sensors R10–R14 in the second group are connected to ground. Sensors R5–R14 are then connected in either series or parallel fashion in a bridge circuit which can be used with other electronic circuitry as described further below to generate a frequency doubled output. The bridge circuit in FIG. 7B shows a parallel connection.

A second complementary group of magnetoresistive sensors illustrated as hatched rectangles (R5C–R14C) is separated from the first group of magnetoresistive sensor elements (R5–R14) by a distance of $5\lambda$. As shown in FIG. 7A, every magnetoresistive element from the first group (R5–R14) has a corresponding complementary magnetoresistive element R5C–R14C. Complementing magnetoresistive sensor elements in each complementary pair are located on opposite magnetic poles. For example, sensor element R5 is located opposite a north pole while sensor element R5C is located opposite a south pole. In other words, the magnetoresistive sensor elements in the complementary pair are positioned relative to the magnetic pole pattern or scale so they are substantially 180° out of magnetic phase. Complementary sensor elements R5 and R5C are positioned, for example, at the same relative position between magnetic poles but in opposite polarity fields. This positional/magnetic phase relationship is established for each pair of complementary elements.

Figure 9:
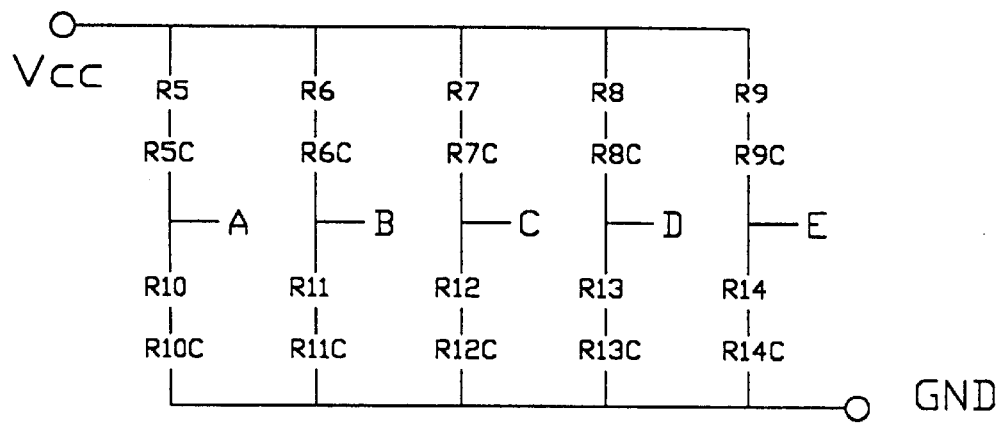
FIG. 9 is a bridge circuit corresponding to the series-connected magnetoresistive sensor element configuration shown in FIG. 8.
Figure 11:
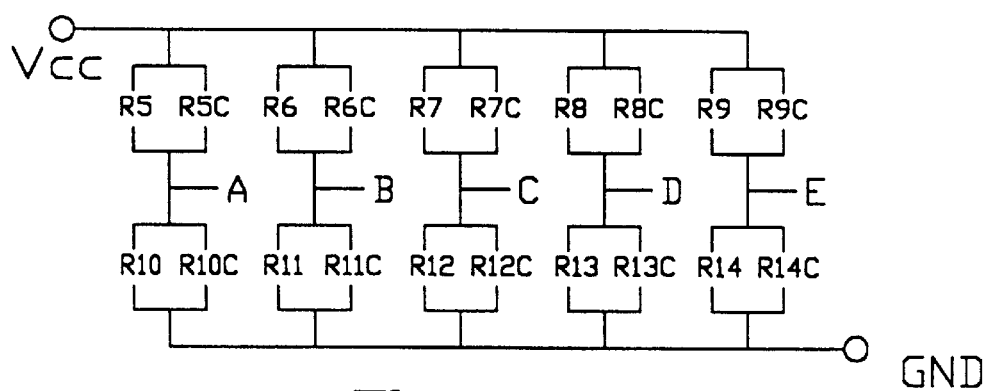
FIG. 11 is a bridge circuit corresponding to the parallel-connected magnetoresistive sensor element configuration shown in FIG. 10.
Figure 8:
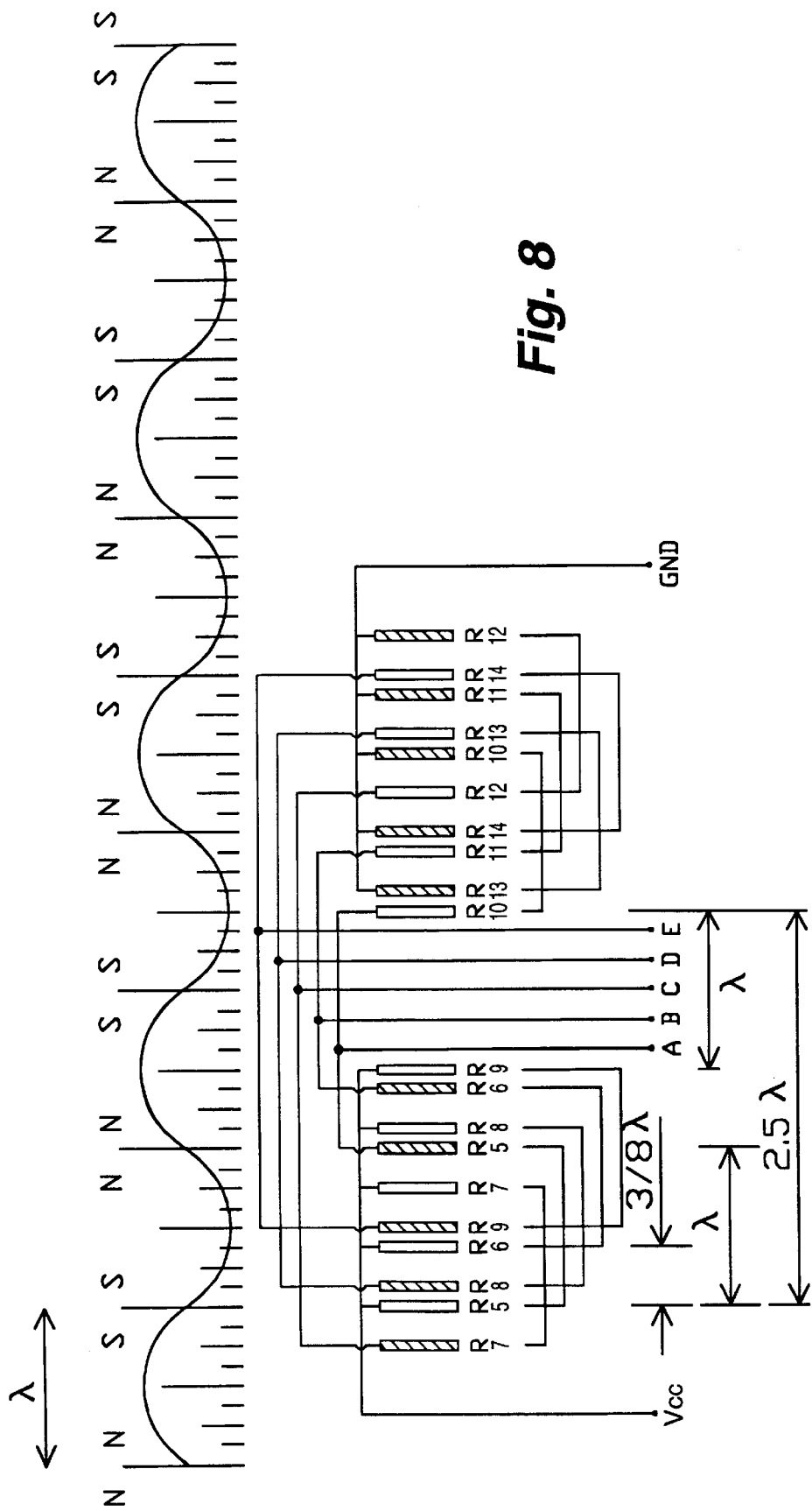
FIG. 8 illustrates a series-connected magnetoresistive sensor in accordance with another example embodiment of the present invention.

While the layout of magnetoresistive sensor elements in FIG. 7A is easy to visualize and understand, it is not necessarily the most practical layout because the sensor elements are so spread out. In accordance with another example embodiment of the invention, FIG. 8 shows a more practical arrangement of magnetoresistive sensors more densely packed together to allow for smaller sensor packages. In fact, the frequency doubling sensor element array in FIG. 8 occupies a distance of $5\lambda$ while that in FIG. 7 occupies a distance of $9\lambda$. Still, the sensor element array in FIG. 8 adheres to a spacing of $3/8\lambda$ between successive bridge components, e.g., R5 and R6 are separated by $3\lambda/8$. Similarly, complementary magnetoresistive elements, e.g., R5 and R5C, are spaced $\lambda$ apart. However, the complementary magnetoresistive elements are interspersed among the first set (R5–R9) and second set (R10–R14). Of course, FIG. 9 shows series-connected complementary sensor element pairs in a half-bridge circuit, and FIG. 11 shows parallel-connected complementary sensor element pairs in a half-bridge circuit.

In FIG. 8, each sensor element and its complement in the first set of magnetoresistive elements R5–R9 are connected in series between voltage supply Vcc and bridge output terminals A–E. Each magnetoresistive sensor element in the second set of elements (R10–R14) and its complement R10C–R14C are connected in series between output terminals A–E and ground. Complementary pairs of magnetoresistive elements are connected in series in each "leg" of a half-bridge. FIG. 9 illustrates the resulting circuit includes a resistive network having plural half-bridge "legs" wherein a pair of complementary magnetoresistive elements from the first group, e.g. R7 and R7C, is connected in series with an associated pair of complementary magnetoresistive elements from the second set, e.g., R12 and R12C.

In both the parallel- and series-connected bridges shown in preceding figures, electrical current flows through the plural half-bridges, and output nodes A–E provide a differential voltage level which indicates the relative magnitudes of current flowing through the respective half-bridges. As the magnetoresistive sensor elements change in resistance due to changes in magnetic flux caused by the magnetic drum rotating past the sensor, the current flowing through the plural half-bridges changes thereby causing a responsive change in the differential voltage level produced by the bridge at each output node. In this way, the bridge array generates a changing voltage output level responsive to the magnetic flux sensed by the associated magnetoresistive elements.

The complementary pairs of magnetoresistive elements in the magnetoresistive sensor effectively implement a magnetic pole time domain cancellation. By connecting the complementary elements such that complementary pairs of elements are in the same quarter bridge (either in parallel or in series), the detected magnetic polarity asymmetries caused by periodic distortions in the detected magnetic field related to the direction of the magnetic field sensor hysteresis or bias distortions and imperfections, (and other factors which contribute to jitter) are substantially cancelled.

Figure 10:
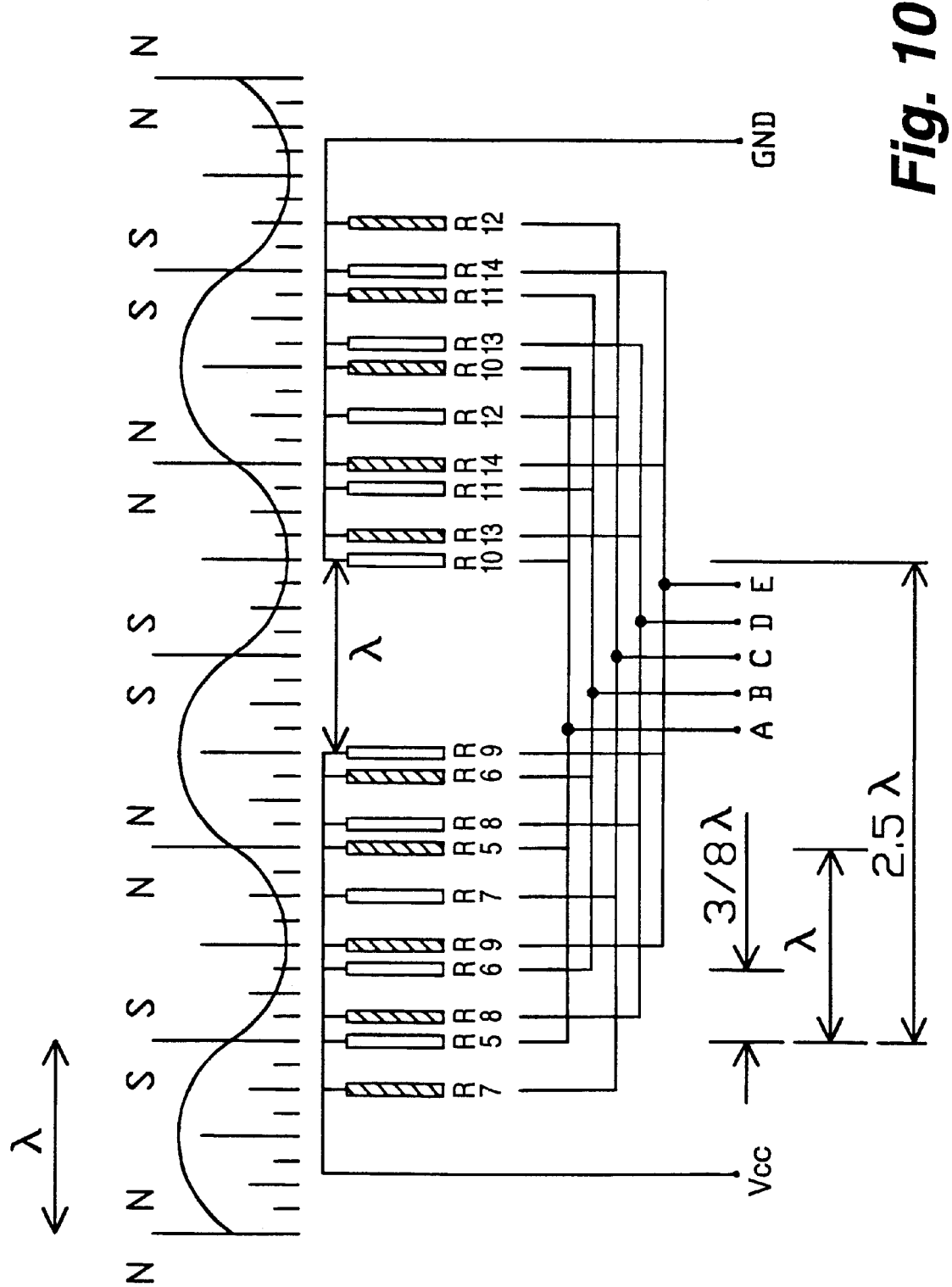
FIG. 10 illustrates a parallel-connected magnetoresistive sensor in accordance with another example embodiment of the present invention.

It is preferred that each sensor element have a corresponding complementary element positioned as shown for example in FIGS. 7A, 8, and 10 to achieve optimal jitter cancellation. However, in accordance with the present invention, jitter can still be cancelled, but to a lesser degree, using fewer numbers of complementary elements. The present invention may be practiced for example with one complementary element corresponding to only one unprimed element in the first set, a number of complementary elements less than the total number in the first set, or a complete second set of corresponding complementary elements. Increasing the number of complementary elements increases the amount of jitter cancelled.

Since jitter is basically due to sensor output asymmetries, the present invention in the example embodiments effectively implements a signal averaging technique such that a north pole sensor element and a south pole sensor element are averaged together via connection in a half leg of the bridge. Of course, other circuits and/or techniques may be used to implement the sensor element averaging. In addition, more than two signals may be averaged together to achieve the jitter cancellation effect as long as the elements being averaged are positioned in the magnetoresistive element array such that they compensate for asymmetric nonuniformities. Jitter values for a frequency doubling magnetoresistive sensor designed in accordance with the present invention achieved jitter values of less than one percent. Accordingly, the present invention can be used to great advantage to increase the accuracy and reliability of magnetoresistive sensors used, for example, in high precision rotary encoders. Such high accuracy and reliability are extremely beneficial in frequency multiplying, e.g., frequency doubling sensors. The present invention therefore is particularly directed to frequency multiplying sensors where jitter errors are compounded in the multiplying operations.

Figure 1:
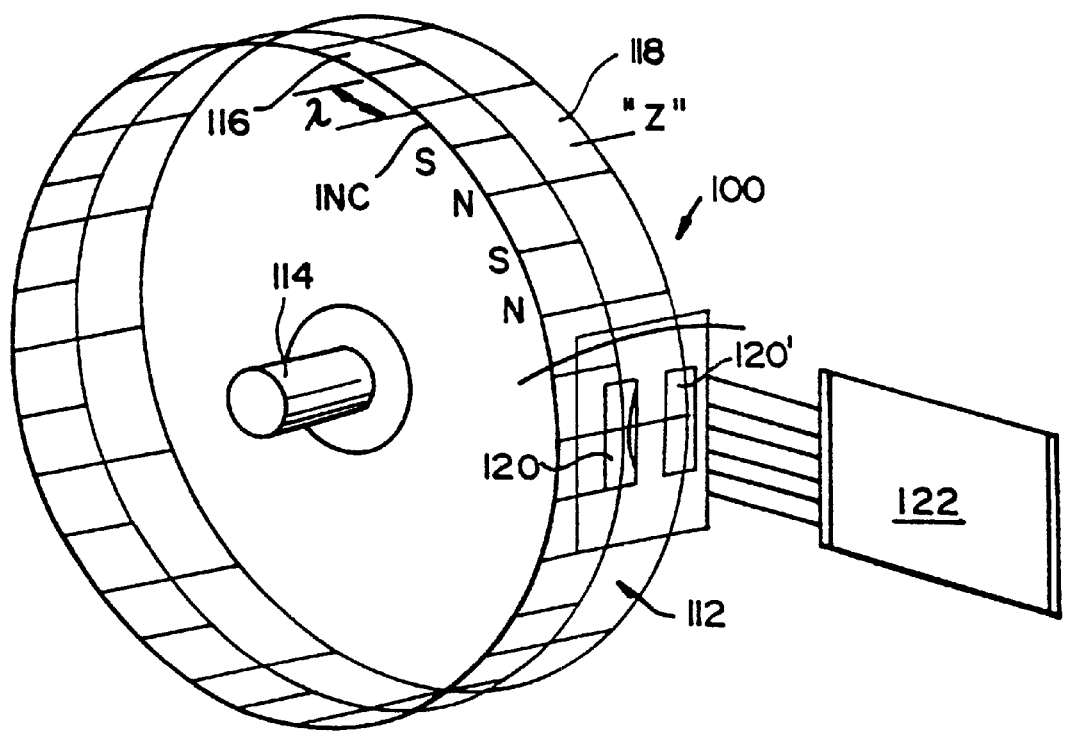
FIG. 1 is a schematic illustration of a magnetic drum having one or more magnetic tracks disposed on its peripheral surface and magnetoresistive elements and associated sensing and conditioning circuitry.
Figure 2A:
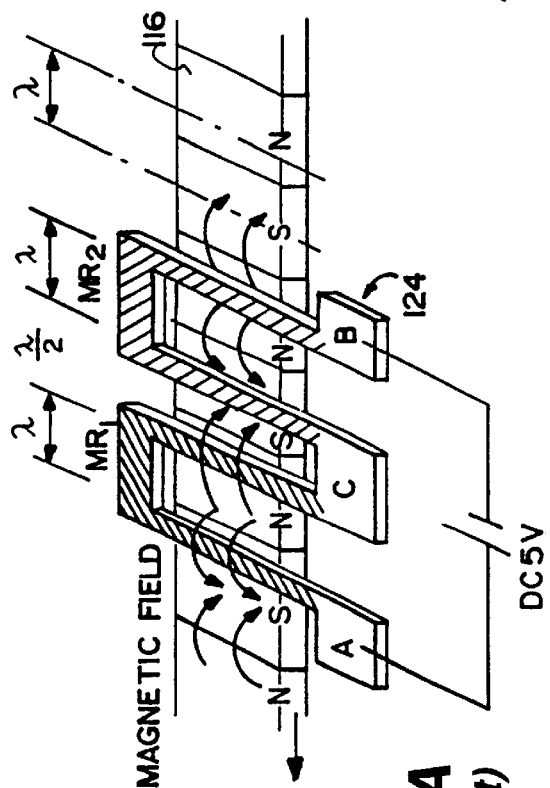
FIG. 2A is a perspective view of two magnetoresistive elements disposed above the magnetized track formed on the periphery of the magnetic drum.
Figure 2B:
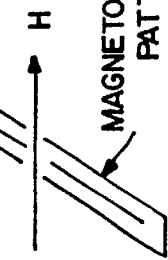
FIG. 2B illustrates the relationship between the direction of current in a magnetoresistive pattern or strip and a transverse magnetic field which affects the pattern resistance and hence the current.
Figure 2C:
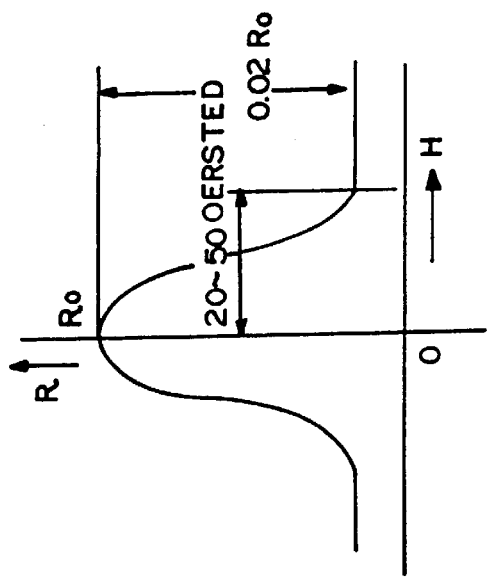
FIG. 2C is a graph illustrating how the resistance of the magnetoresistor changes with increasing magnetic fields.
Figure 2D:
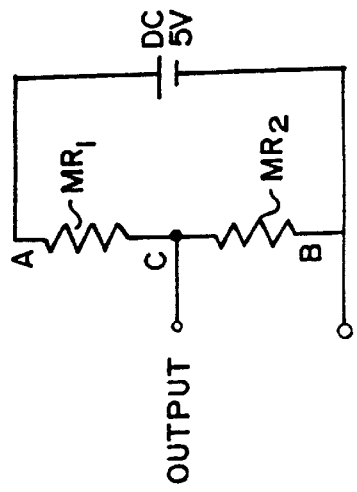
FIG. 2D is a bridge circuit illustrating how the magnetoresistive elements of FIG. 2A are connected in a differential bridge configuration.
Figure 3:
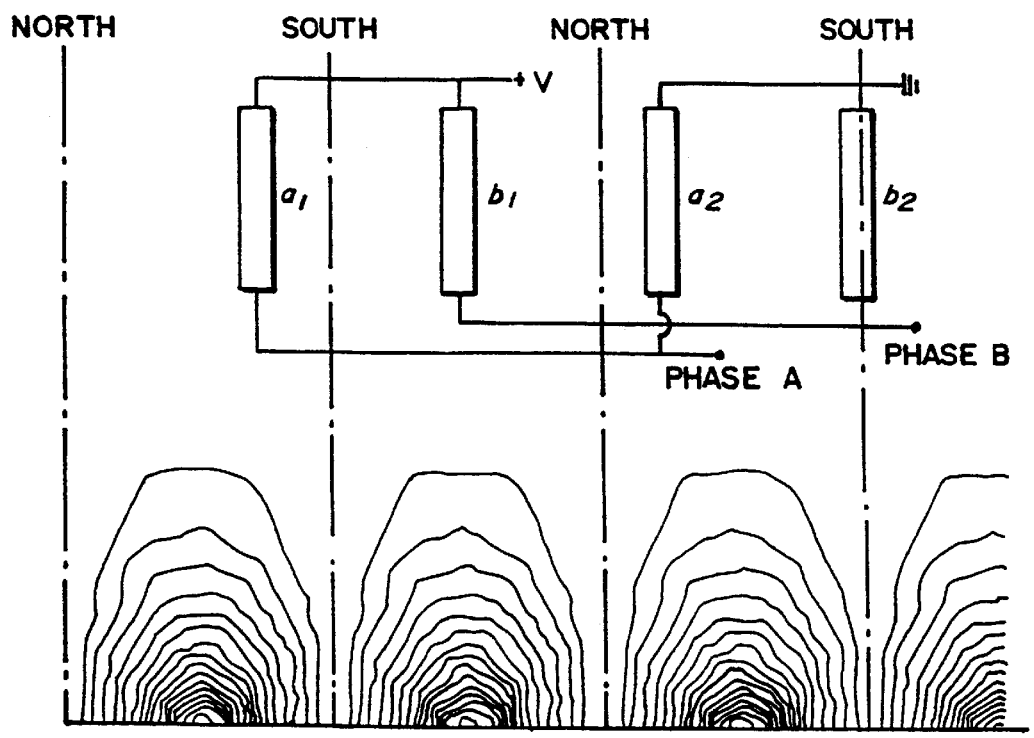
FIG. 3 is an illustration of how magnetoresistive elements are positioned above a magnetic field plot generated by the north/south poles formed on the magnetic drum in order to obtain different phase/quadrature output signals.
Figure 4:
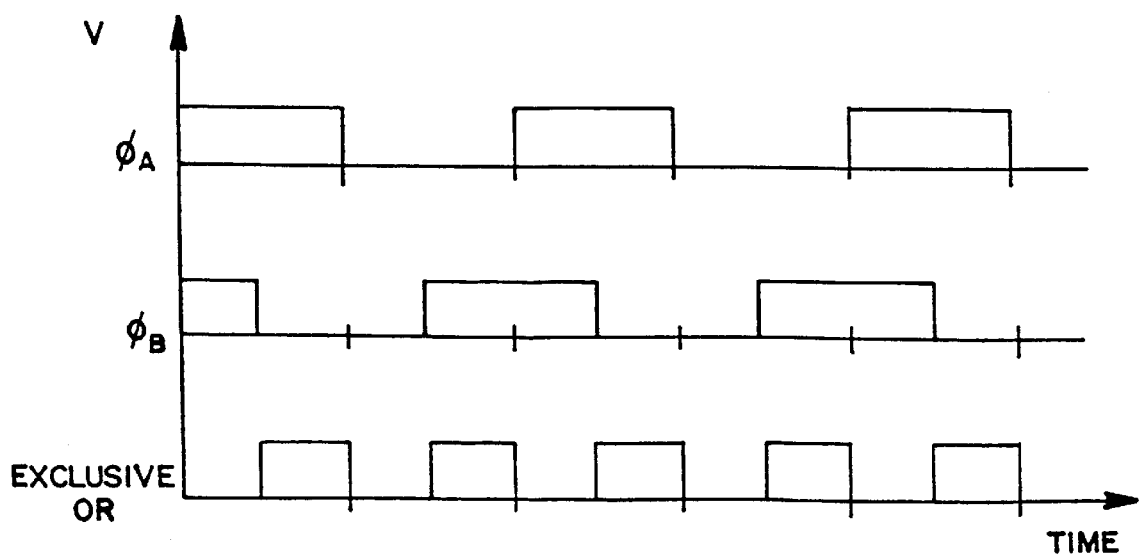
FIG. 4 is a graph of simplified waveforms indicating the quadrature relationship between phase A, phase B, and a double frequency generated by exclusive-ORing the two quadrature phases.

A more detailed explanation of the frequency doubling operation of the magnetoresistive sensor array embodiments is now provided. The bridge circuits shown in FIGS. 9 and 11 have five half-bridge output nodes A–E, where each half-bridge output voltage is sinusoidal in X, where X is the distance travelled by the sensor array over the magnetized surface, which in the example embodiment is formed on the circumference of drum 100 from FIG. 1. Movement of the drum 100 may be expressed in terms of phase angle. One cycle corresponds to relative movement between the sensor and one magnetic pole spacing or wavelength $\lambda$ of the drum surface. Representing X as an angular dimension over $\lambda$ and setting the initial phase to zero allows the voltage output of each half-bridge node to be expressed as V sin $\theta$, where $\theta$ is the angular position of the drum in radians. Circumferential movement of the drum of a distance of $\lambda$ corresponds to $2\pi$ radians.

In the above example embodiments, the voltages generated at the five half-bridge nodes A–E have a phase difference between each of the half-bridges of $3\lambda/8$. The five half-bridge voltages may be represented by $$V_A = V \sin \theta,$$

$$V_B = V \sin[\theta - (3/8)*2\pi],$$

$$V_C = V \sin[\theta - (6/8)*2\pi],$$

$$V_D = V \sin[\theta - (9/8)*2\pi],$$

$$V_E = V \sin[\theta - (12/8)*2\pi].$$

Figure 12:
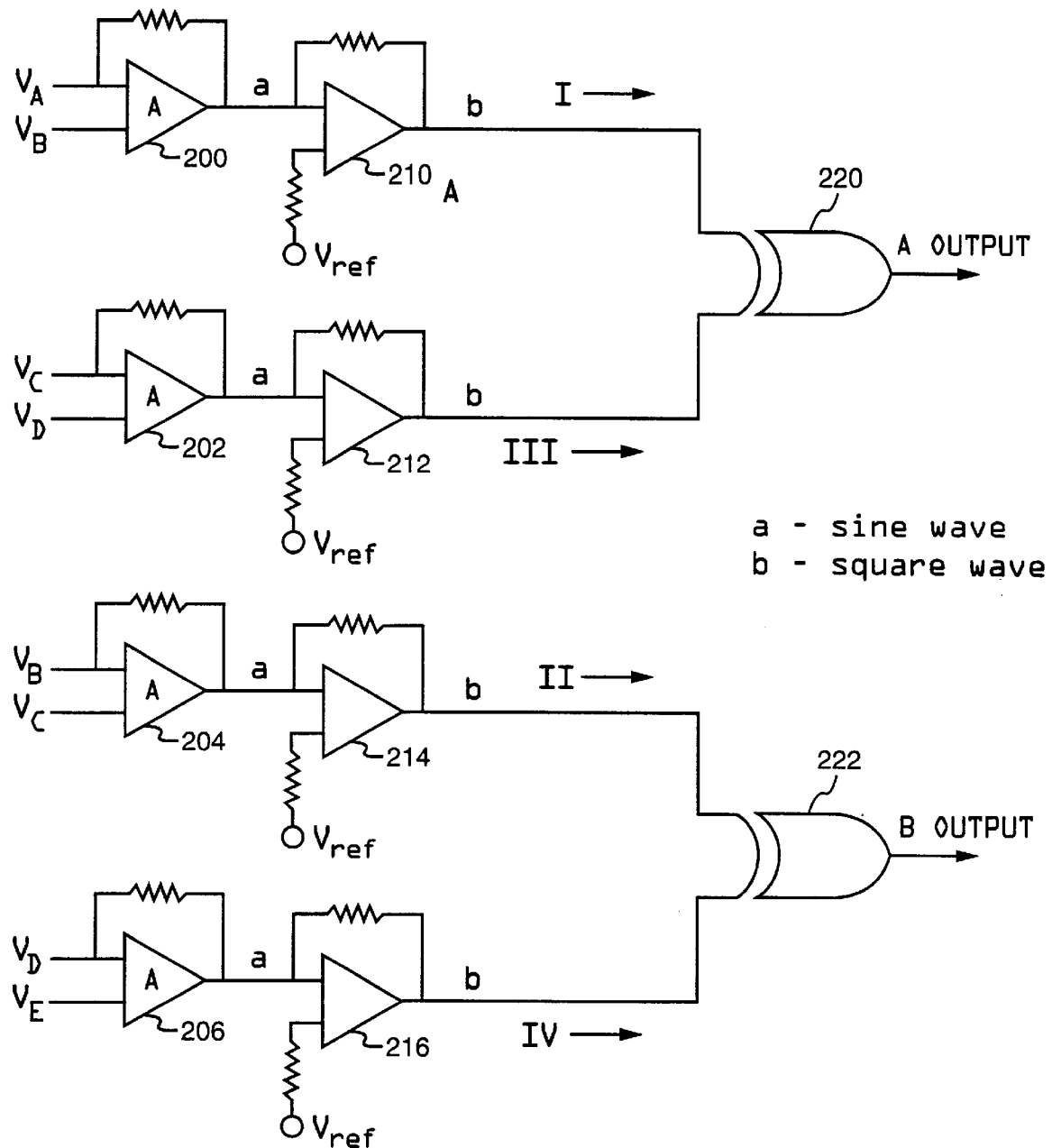
FIG. 12 is an example, simplified schematic of electronic circuitry for implementing frequency doubling using half-bridge outputs A–E.
Figure 13:
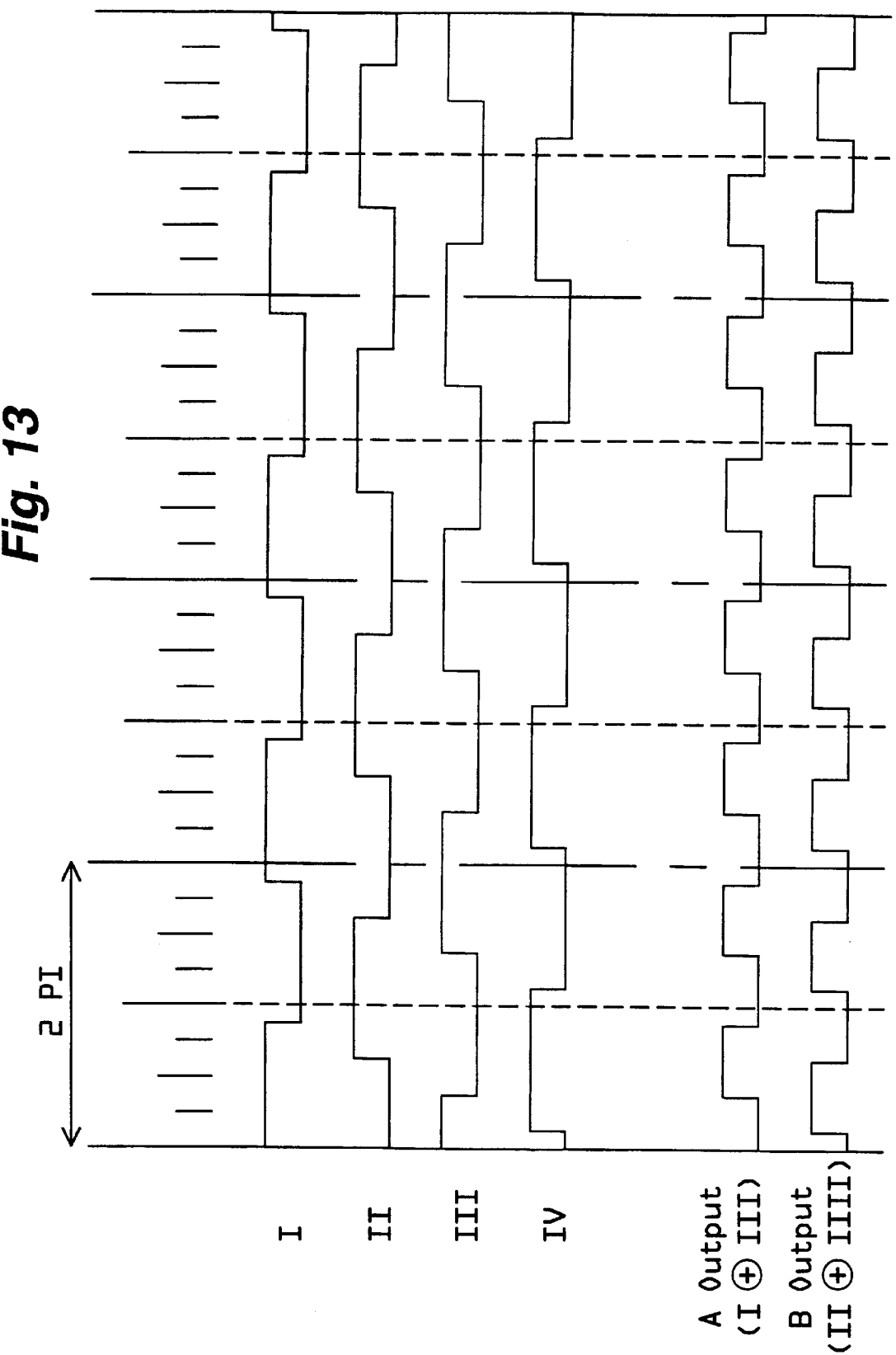
FIG. 13 is a timing diagram used to illustrate frequency doubling in accordance with the electronic circuitry shown in FIG. 12.

The phase difference between these signals $V_A$–$V_E$ is used to create square waves such as those shown in FIG. 13 using the electronic circuitry illustrated in FIG. 12.

Referring now to FIG. 12, the half-bridge outputs A and B are connected to a differential amplifier 200; half-bridge outputs C and D are connected to a differential amplifier 202; half-bridge outputs B and C are connected to a differential amplifier 204; and half-bridge outputs D and E are connected to a differential amplifier 206. Each differential amplifier 200–206 subtracts its two inputs and generates a corresponding amplified difference I–IV. The amplified difference signals I–IV are sine waves, and therefore, these differences may be expressed mathematically as follows:

$$I = V_A - V_B = V[\sin\theta - \sin\{\theta - (3/8)*2\pi\}]$$
$$= 2V[\sin(\pi/8)\sin(\theta - 15\pi/8)]$$

$$II = V_B - V_C = V[\sin\{\theta - (3/8)*2\pi\} - \sin\{\theta - (6/8)*2\pi\}]$$
$$= 2V[\sin(3\pi/8)\sin(\theta - 5\pi/8)]$$

$$III = V_C - V_D = V[\sin\{\theta - (6/8)*2\pi\} - \sin\{\theta - (9/8)*2\pi\}]$$
$$= 2V[\sin(3\pi/8)\sin(\theta - 11\pi/8)]$$

$$IV = V_C - V_B = V[\sin\{\theta - (9/8)*2\pi\} - \sin\{\theta - (12/8)*2\pi\}]$$
$$= 2V[\sin(3\pi/8)\sin(\theta - \pi/8)]$$

The zero crossings of these sinusoidal difference waveforms I–IV occur as follows:

$$I \rightarrow \theta = 7\pi/8, 15\pi/8$$

$$II \rightarrow \theta = 5\pi/8, 13\pi/8$$

$$III \rightarrow \theta = 3\pi/8, 11\pi/8$$

$$IV \rightarrow \theta = \pi/8, 9\pi/8$$

Each amplified difference signal is then sent to a corresponding comparator 210, 212, 214, and 216. Each comparator 210–216 generates a corresponding square wave output with high-to-low and low-to-high transitions occurring when the input difference signal passes through a reference voltage $V_{ref}$. The reference voltage $V_{ref}$ is adjusted to optimize output signal characteristics such as duty cycle and phase and may be viewed functionally as the zero crossing point. The corresponding square waves (I–IV) generated by comparators 210–216 are shown in the top series of waveforms in FIG. 13. Zero crossings of each square wave output I–IV may then be readily determined for specific values of $\theta$ as follows:

$$I = 2V[\sin(5\pi/8)\sin(\theta + \pi/8)] \theta = 7\pi/8, 15\pi/8$$

$$II = 2V[\sin(5\pi/8)\sin(\theta + 11\pi/8)] \theta = 5\pi/8, 13\pi/8$$

$$III = 2V[\sin(5\pi/8)\sin(\theta + 5\pi/8)] \theta = 3\pi/8, 11\pi/8$$

$$IV = 2V[\sin(5\pi/8)\sin(\theta + 15\pi/8)] \theta = 9\pi/8, 15\pi/8$$

Square waves I and III from comparators 210 and 212 are passed through an exclusive-OR gate 220 to produce square wave output A shown at the bottom of FIG. 13. These transition points occur at zero crossings $3\pi/8$, $7\pi/8$, $11\pi/8$, and $15\pi/8$. Square wave signals II and IV generated by comparators 214 and 216 are exclusive-ORed in logic gate 222 to generate square wave output B shown at the bottom of FIG. 13. The transition points occur at zero crossing $\pi/8$, $5\pi/8$, $9\pi/8$, and $13\pi/8$. Because both outputs A and B have four zero crossings in the same time period that a half-bridge output has two zero crossings, the frequency is "doubled."

Figure 14:
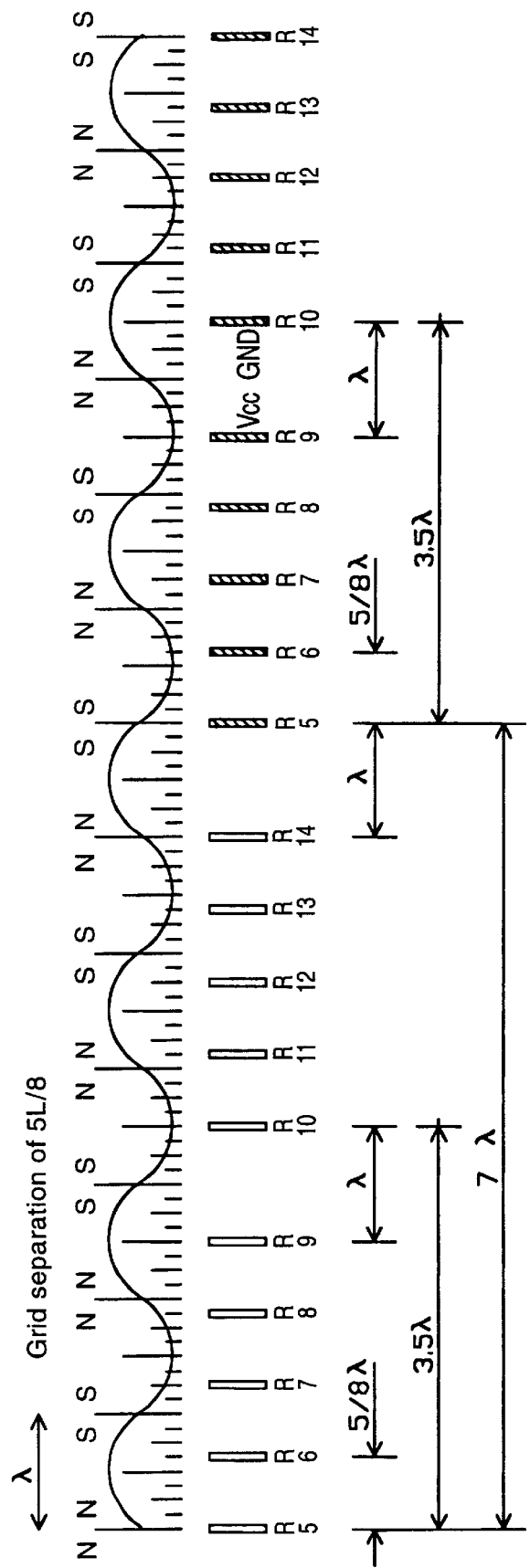
FIG. 14 illustrates another specific example embodiment of a magnetoresistive sensor array in which there is a sensor element separation of $5/8\lambda$.

FIG. 14 shows another example embodiment of a frequency doubling sensor in which successive sensor elements, e.g., R5 and R6, are separated by $\frac{5}{8}\lambda$. The first set of sensors R5–R9 is separated from the second set of sensors R10–R14 by $\lambda$. However, the first element of the first and second sets, i.e., R5 and R10, are separated by $3\frac{1}{2}\lambda$ rather than $2\frac{1}{2}\lambda$. Moreover, the complementary sensors R5C–R14C are separated from their corresponding sensor pair element by $7\lambda$ as opposed to $5\lambda$.

Figure 15:
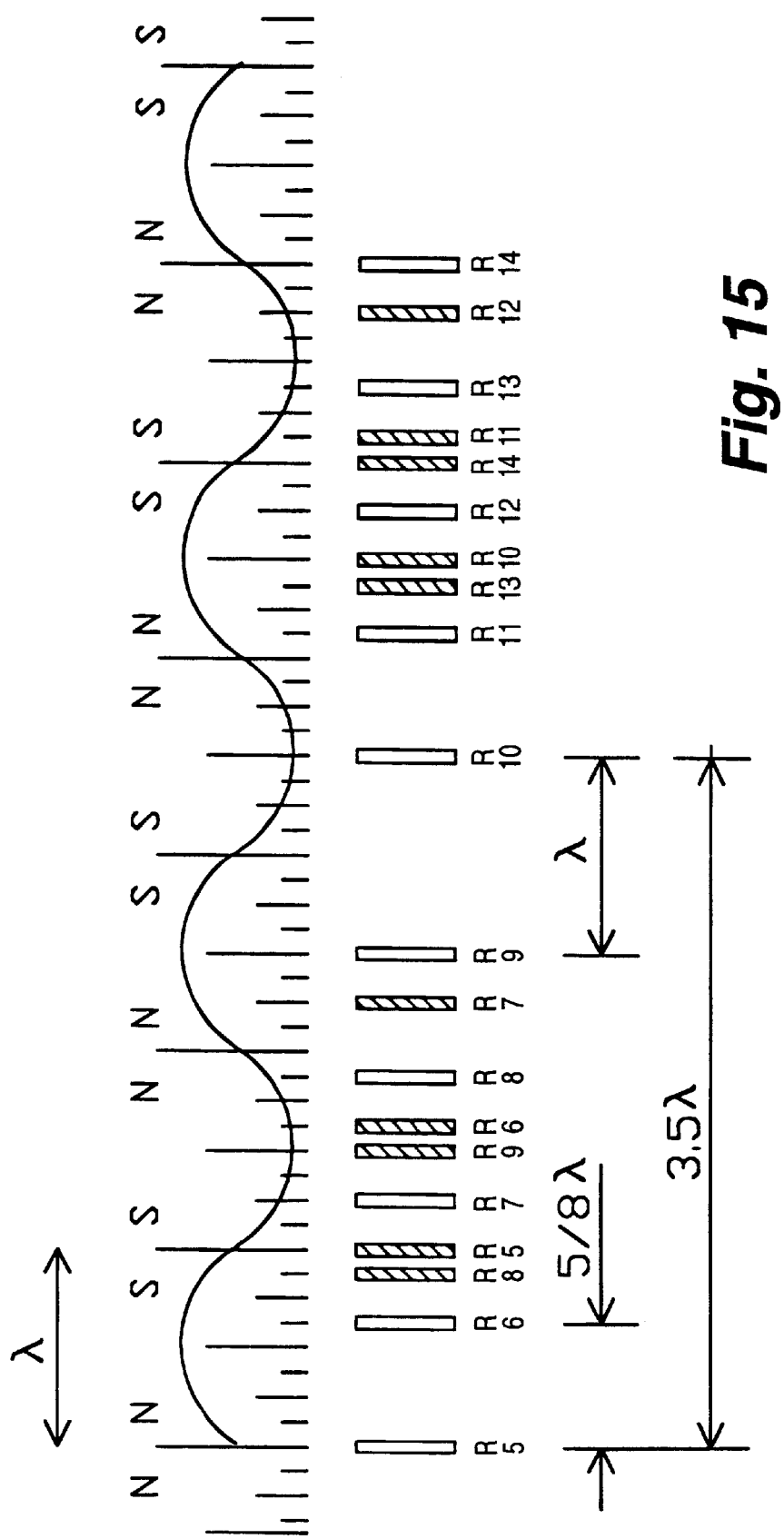
FIG. 15 illustrates another specific example embodiment of a magnetoresistive sensor array having a more compact configuration in which there is a sensor element separation of $5/8\lambda$.

FIG. 15 illustrates a more practical and densely compacted array of complementary magnetoresistive sensors having the same frequency doubling spacing set forth in FIG. 14 but more compactly and densely spaced for a more practical implementation of this example embodiment of the present invention.

Figure 16:
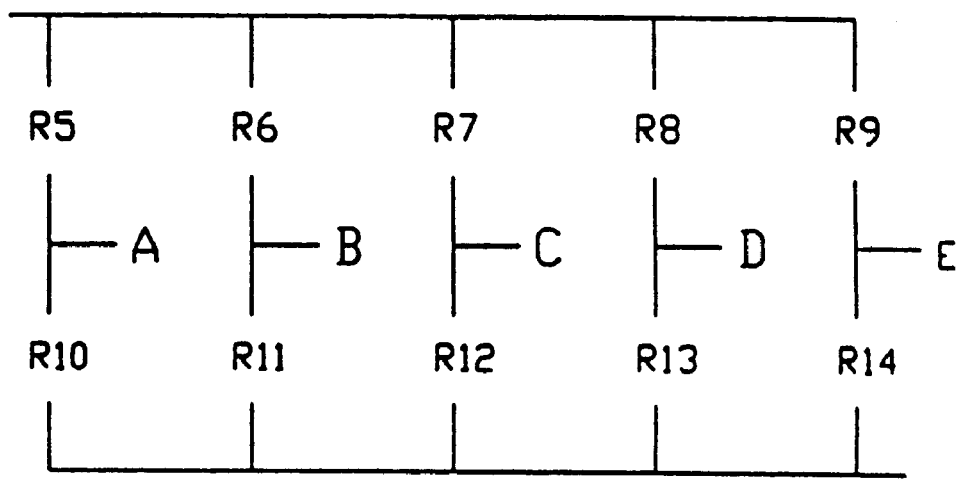
FIG. 16 is a reference bridge circuit for use in interpreting the sensor configurations shown in FIGS. 14 and 15.

FIG. 16 shows a representative bridge array for reference where each resistor notation "R" represents a complementary pair of magnetoresistive sensor elements. For example, R5 in FIG. 16 corresponds to R5 and R5C connected either in series or in parallel as a complementary magnetoresistive sensor pair.

While various specific configurations of complementary magnetoresistive pairs have been illustrated and described for specific example embodiments of a frequency doubling magnetoresistive sensor, a frequency doubling magnetoresistive sensor in accordance with the present invention is now characterized more generally using a series of construction rules as described below.

First, each half-bridge is composed of two magnetoresistive sensors separated by a distance of $(n+\frac{1}{2})\lambda$ where n equals 0, ±1, ±3, . . . The variable n may be set to zero or maintained at a low number to keep the overall sensor design configuration compact. Second, the magnetoresistive sensor elements in the top half of the first and second half-bridges are spaced a distance of $(n+\frac{3}{8})\lambda$. Third, the top half magnetoresistive sensor element for the third half-bridge is separated from the top half sensor element of the second half-bridge by $(n+\frac{3}{8})\lambda$ and from the top half sensor element of the first half-bridge by $(n+(2)*\frac{3}{8})\lambda$. Fourth, this element spacing continues with the separation of the top half fourth half-bridge sensor element being separated from the top half third half-bridge sensor element by $(n+\frac{3}{8})\lambda$, from the second by $(n+(2)*\frac{3}{8})\lambda$, and from the first by $(n+(3)*\frac{3}{8})\lambda$. Fifth, continue the process for a fifth or greater number of half-bridges. Sixth, the bottom half sensor element of each half-bridge is separated by $(n+\frac{1}{2})$, from the top half sensor element of each half-bridge. Seventh, for each magnetoresistive sensor element for which a complementary sensor element is desired, separate each sensor element in the complementary pair by $(2n+1)\lambda$ in both the top and bottom halves of each half-bridge. Of course, the value of the variable "n" may vary.

The above example embodiments of the present invention provide excellent jitter compensation for frequency doubling (multiplying) magnetoresistive sensor arrays using complementary magnetoresistive sensor elements. Jitter asymmetries addressed in these embodiments include asymmetries in detecting the magnetic field resulting from magnetoresistive sensor material hysteresis/bias, variations in gap separation between the magnetized drum and magnetoresistive sensor, misalignment of the sensor with respect to the magnetized pattern, etc. However, the present invention also compensates for magnetoresistive sensor inaccuracies caused by differences in temperature.

Many magnetosisitive sensors are sensitive to changes in temperature. If the resistive changes in the sensor elements due to changes in temperature are substantially equal then the ratiometric output of half-bridges composed of these elements remains substantially unchanged. Therefore, a uniform change in temperature of the sensor elements does not substantially change the ratiometric outputs of half-bridge circuits.

However, if the temperature of a sensor element in one portion of a half-bridge changes with respect to a sensor element in the other portion of the same half-bridge, an offset is generated in the ratiometric voltage output of that half-bridge. In non-frequency generating applications, this offset causes small changes in the duty cycles of the square wave outputs. In many cases, the changes are small enough that the sensors still provide a useful output.

In frequency multiplying applications, such as frequency doubling, the output depends on the duty cycle. Small changes in the duty cycle have a significant effect on any frequency multiplied output. The variations in duty cycle, for example, of the frequency multiplied output will be significant.

There are several sources of temperature gradients that can give rise to changes in frequency multiplying outputs including temperature change in the environment, equipment heat up or cool down, air movement or changes in air flow and humidity. Another significant source of temperature gradients is self-heating of the sensor elements. Combining these sources with air flow from the motion of the drum (i.e., the drum is in close proximity to the sensor and its speed can vary from zero to many thousands of revolutions per minute) causes changes in temperature gradients.

Sensor gridline densities often vary across the face of the sensor array. As the densities vary, the amount of sensor element self-heating varies. This further increases the variance in the ratiometric half-bridge outputs. A symmetric sensor gridline configuration tends to minimize this effect. Further, adding extra gridlines to act as heater elements may also be used to compensate for variances in sensor element self-heating.

The inventors of the present invention recognized and significantly reduced this temperature gradient problem by reducing the spatial separation between sensor elements in each half-bridge. The closer the half-bridge sensor elements are located in the array, the smaller chance of a significant temperature difference between the two legs of the half-bridge. Thus, in accordance with this embodiment of the present invention, the magnetoresistive sensors are configured so that the sensor elements in each half-bridge are in close proximity to each other. Such a temperature compensation arrangement of sensor elements is preferably (although not necessarily) implemented with the complementary sensor element pair configurations noted above.

Turning to specific configuration examples, consider for example the relatively compact complementary magnetoresistive sensor configuration shown in FIG. 10. Sensor elements R5 and R10 included in the same half-bridge are separated by $2.5\lambda$. Similar separations may be seen between sensor elements in the other half-bridge legs. In order to minimize the effect of temperature gradients on sensor elements in the same half-bridge, similar elements in the same half-bridge are moved in close proximity to minimize the temperature differences caused by thermal gradients across the length of the sensor.

Figure 19:
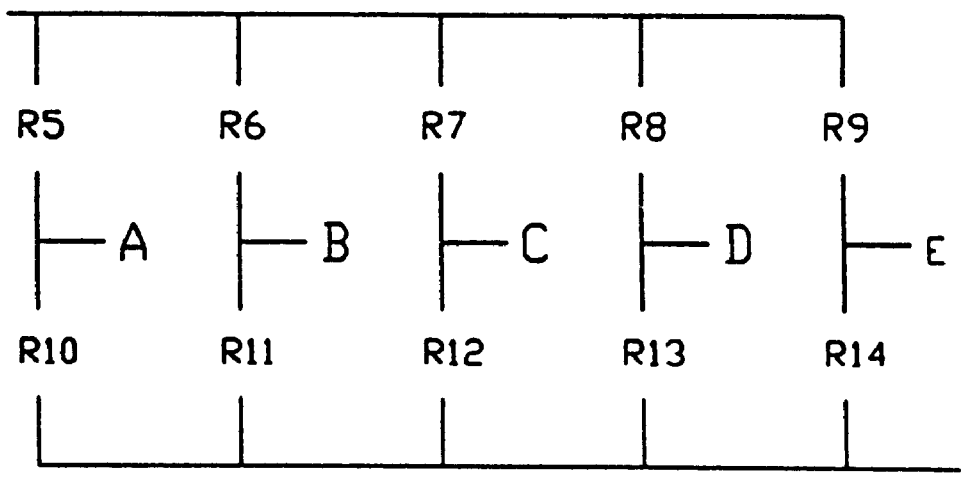
FIG. 19 is a bridge circuit for assisting in interpreting the sensor element arrays shown in FIGS. 17 and 18.
Figure 17:
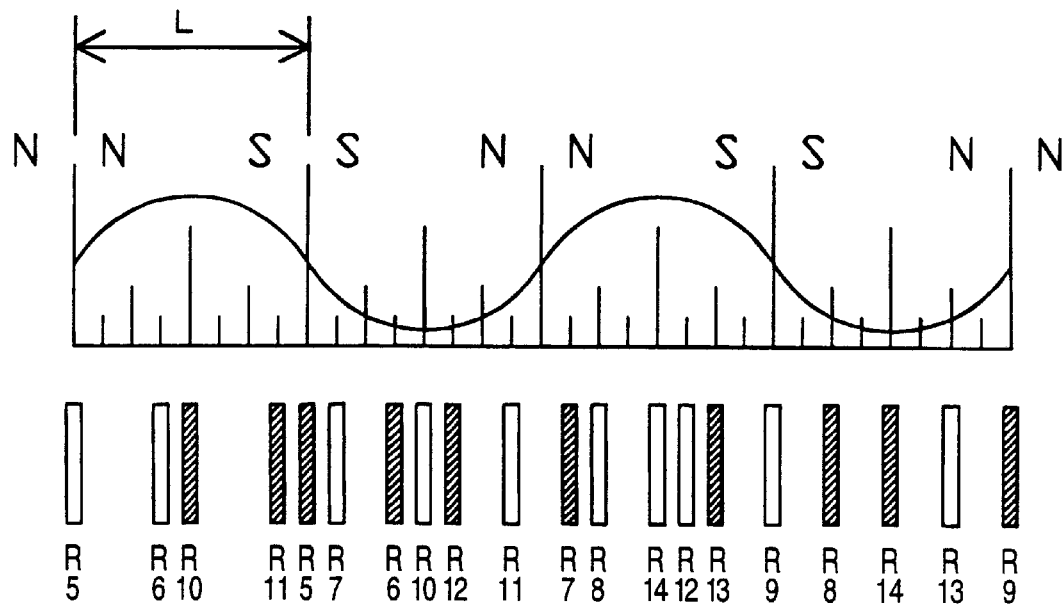
FIG. 17 is a magnetoresistive sensor array in which the sensor elements separation is $3/8\lambda$ and in which the sensor elements are configured to compensate for the effects of temperature gradients.

One example implementation for a frequency doubling magnetoresistive sensor configuration having complementary magnetoresistive element pairs and a spacing between successive elements of $3\lambda/8$ is shown in FIG. 17. Comparing the sensor array of FIG. 17 with that shown in FIG. 10 reveals that R5, R5C, R10, and R10C in FIG. 17 are all located within $1.5\lambda$ while in FIG. 10, R5, R5C, R10, and R10C are located across $3.5\lambda$. As shown in the bridge circuit in FIG. 19, half-bridge elements R5 and R10, R6 and R11, R7 and R12, R8 and R13, and R9 and R14 are spaced in close proximity with one another.

Figure 18:
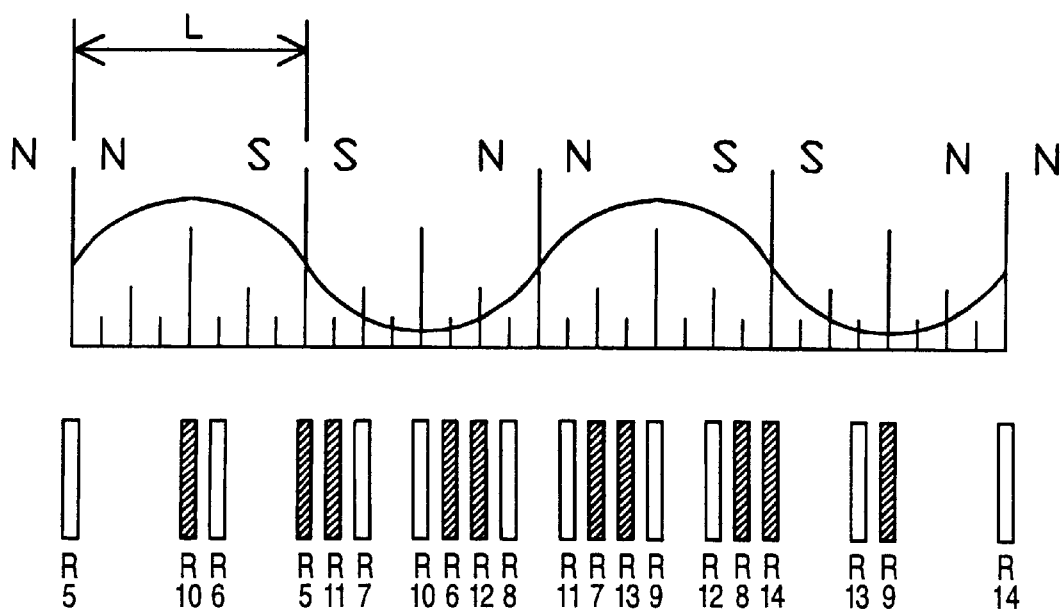
FIG. 18 is a magnetoresistive sensor having a sensor element separation of $5/8\lambda$ where the sensor elements are configured to compensate for the effects of temperature gradients.

A similar reconfiguration of complementary magnetoresistive elements is shown in FIG. 18 to minimize the effect of temperature gradients for a sensor configuration having an element spacing of $5\lambda/8$. When compared to the $\frac{5}{8}\lambda$ sensor spacing configuration shown in FIG. 15 where sensor elements R5, R5C, R10, and R10C in the half-bridge A are spaced over $4.5\lambda$, the same half-bridge elements in FIG. 18 are spaced over only $1.5\lambda$. In the example configurations shown in FIGS. 17 and 18, the effect of thermal gradients is minimized because the magnetoresistive sensor elements of the same half-bridge experience substantially the same temperature gradient. Thus, the sensor element configurations in FIGS. 17 and 18 include complementary magnetoresistive pairs configured to cancel jitter for a frequency doubling magnetoresistive sensor and sensor elements in the same half-bridge located in close proximity to minimize the impact of temperature gradients on the sensor's accuracy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A frequency doubling sensor array to detect the motion of a magnetic pattern generated by a moving magnetic source magnetized at a pitch $\lambda$, comprising:

a first pair of sensor elements separated by $2\frac{1}{2}\lambda$ and connected to form a first half-bridge;

a second pair of sensor elements separated by $2\frac{1}{2}\lambda$ and connected to form a second half-bridge, the first sensor element of the first and second pairs being separated by $3\lambda/8$;

a third pair of sensor elements separated by 2½λ and connected to form a third half-bridge, the first sensor element of the third pair being separated by 3λ/8 from the first sensor element in the second pair and by 3λ/4 from the first sensor element in the first pair;

a fourth pair of sensor elements separated by 2½λ and connected to form a fourth half-bridge, the first sensor element of the fourth pair separated by 3λ/8 from the first sensor element in the third pair and by 3λ/4 from the first sensor element in the second pair; and plural complementary sensor elements, each complementary sensor element separated by λ from and connected to a corresponding sensor element of the first through fourth pairs of sensor elements.

2. The sensor array in claim 1, wherein the first through fourth pairs of sensor elements are connected in parallel or in series.

3. The sensor array in claim 1, wherein the complementary sensor elements are connected in parallel or in series to their corresponding elements in the first through fourth half-bridges.

4. The sensor array in claim 1, further comprising:

a fifth pair of sensor elements separated by 2½λ and connected to form a fifth half-bridge, the first sensor element of the fifth pair being separated by 3λ/8 from the first sensor element in the fourth pair and by 3λ/4 from the first sensor element in the third pair.

5. The sensor array in claim 1, wherein sensor elements in at least one of the half-bridges are placed in close proximity to minimize an effect of a temperature difference across the one half-bridge.

6. The sensor array in claim 9, further comprising:

a fifth pair of sensor elements separated by 3½λ and connected to form a fifth half-bridge, the first sensor element of the fifth pair of sensor elements being separated by 5λ/8 from the first sensor element in the fourth pair of sensor elements and by 1¼λ from the first sensor element in the third pair of sensor elements.

7. The sensor array in claim 6, wherein the first through fifth pairs of sensor elements are connected in parallel or in series.

8. The sensor array in claim 7, wherein the complementary sensor elements are connected in parallel or in series to their corresponding elements in the first through fifth half-bridges.

9. A frequency doubling sensor array to detect the motion of a magnetic pattern generated by a moving magnetic source magnetized at a pitch λ, comprising:

a first pair of sensor elements separated by 3½λ and connected to form a first half-bridge;

a second pair of sensor elements separated by 3½λ and connected to form a second half-bridge, the first sensor element of the first and second pairs being separated by 5λ/8;

a third pair of sensor elements separated by 3½λ and connected to form a third half-bridge, the first sensor element of the third pair being separated by 5λ/8 from the first element in the second pair and by 1¼λ from the first element in the first pair;

a fourth pair of sensor elements separated by 3½λ and connected to form a fourth half-bridge, the first sensor element of the fourth pair separated by 5λ/8 from the first sensor element in the third pair and by 1¼λ from the first sensor element in the second pair;

plural complementary sensor elements, each complementary sensor element separated by λ from and connected to each sensor element of each of the first through fourth pairs of sensor elements.

10. The sensor array in claim 9, wherein sensor elements in at least one of the half-bridges are placed in close proximity to minimize an effect of a temperature difference across the one half-bridge.

11. A frequency doubling magnetoresistive sensor array to detect the motion of a magnetic pattern generated by a moving magnetic source magnetized at a pitch λ, comprising:

a first pair of sensor elements separated by (n+½)λ and connected to form a half-bridge, where n is an integer;

a second pair of sensor elements separated by (n+½)λ and connected to form a half-bridge, with the first sensor element of the first and second pairs of sensor elements being separated by (n+3/8)λ;

a third pair of sensor elements separated by (n+½)λ and connected to form a half-bridge, with the first sensor element of the third pair of sensor elements being separated by (n+3/8)λ from the first sensor element in the second pair of sensor elements;

a fourth pair of sensor elements separated by (n+½)λ and connected to form a half-bridge, with the first sensor element of the fourth pair of sensor elements being separated by (n+3/8)λ from the first sensor element in the third pair of sensor elements; and complementary sensor elements corresponding and electrically connected to sensor elements for at least some of the first through fourth pairs of sensor elements, each complementary and corresponding sensor element spaced apart by (2n−1)λ.

12. The sensor array in claim 11, wherein the integer value of n differs for the first through the fourth pairs of sensor elements.

13. The sensor array in claim 11, further comprising:

a fifth pair of sensor elements separated by (n+½)λ and connected to form a half-bridge, with the first sensor element of this pair separated by 3λ/8 from the first sensor element in the fourth pair of sensor elements.

14. The sensor array of claim 11, wherein each pair of sensor elements is connected serially or in parallel in a half-bridge configuration.

15. The sensor array of claim 14, wherein complementary sensor elements are connected in a series or parallel to their corresponding sensor elements.

16. The sensor array in claim 11, wherein sensor elements in at least one of the half-bridges are placed in close proximity to minimize an effect of a temperature difference across the one half-bridge.

17. A frequency doubling magnetoresistive sensor array to detect the motion of a magnetic pattern generated by a moving magnetic source magnetized at a pitch λ, comprising:

a first pair of sensor elements separated by (n+½)λ and connected to form a half-bridge, where n is an integer;

a second pair of sensor elements separated by (n+½)λ and connected to form a half-bridge, with the first sensor element of the first and second pairs of sensor elements being separated by 3λ/8;

a third pair of sensor elements separated by (n+½)λ and connected to form a half-bridge, with the first sensor element of the third pair of sensor elements being separated by 3λ/8 from the first sensor element in the second pair of sensor elements;

a fourth pair of sensor elements separated by (n+½)λ and connected to form a half-bridge, with the first sensor element of the fourth pair of sensor elements being separated by 3λ/8 from the first sensor element in the third pair of sensor elements; and complementary sensor elements corresponding and electrically connected to sensor elements for at least some of the first through fourth pairs of sensor elements, each complementary and corresponding sensor element spaced a distance of (2m−1)λ, where m is an integer other than one.

18. The sensor array in claim 17, further comprising:

a fifth pair of sensor elements separated by (n+½)λ and connected to form a half-bridge, with the first sensor element of the fifth pair of sensor elements being separated by 3λ/8 from the first sensor element in the fourth pair of sensor elements.

19. The sensor array in claim 17, wherein sensor elements in at least one of the half-bridges are placed in close proximity to minimize an effect of a temperature difference across the one half-bridge.

20. A frequency doubling magnetoresistive sensor array to detect the motion of a magnetic pattern generated by a moving magnetic source magnetized at a pitch λ, comprising:

a first pair of sensor elements separated by (n+½)λ and connected to form a half-bridge, where n is an integer other than zero;

a second pair of sensor elements separated by (n+½)λ and connected to form a half-bridge, with the first sensor element of the first and second pairs of sensor elements being separated by 5λ/8;

a third pair of sensor elements separated by (n+½)λ and connected to form a half-bridge, with the first sensor element of the third pair of sensor elements being separated by 5λ/8 from the first sensor element in the second pair of sensor elements;

a fourth pair of sensor elements separated by (n+½)λ and connected to form a half-bridge, with the first sensor element of the fourth pair of sensor elements being separated by 5λ/8 from the first sensor element in the third pair of sensor elements; and complementary sensor elements corresponding and electrically connected to sensor elements for at least some of the first through fourth pairs of sensor elements, each complementary and corresponding sensor element spaced apart by (2n−1)λ.

21. The sensor array in claim 20, further comprising:

a fifth pair of sensor elements separated by (n+½)λ and connected to form a half-bridge, with the first sensor element of this pair separated by 5λ/8 from the first sensor element in the fourth pair of sensor elements.

22. The sensor array in claim 20, wherein sensor elements in at least one of the half-bridges are placed in close proximity to minimize an effect of a temperature difference across the one half-bridge.

23. A magnetoresistive sensor array to detect relative motion between said sensor array and a magnetic source magnetized at a pitch λ said magnetic source providing a magnetic pattern of alternating north and south magnetic poles, said sensor array comprising:

at least first and second pairs of magnetoresistive sensor elements, said first pair of magnetoresistive elements electrically connected to form a first quarter-bridge circuit comprising at least a first sensor element and a second sensor element positioned to magnetically complement one another such that whenever the first sensor element senses a north magnetic pole of said pattern the second sensor element senses a south magnetic pole of said pattern, said second pair of magnetoresistive elements electrically connected to form a second quarter-bridge circuit electrically connected to said first quarter-bridge circuit to form a first half-bridge circuit, said second pair of magnetoresistive elements comprising at least a third sensor element and a fourth sensor element positioned to magnetically complement one another such that whenever the third sensor element senses a north magnetic pole of said pattern the fourth sensor element senses a south magnetic pole of said pattern, a plurality of additional magnetoresistive elements electrically connected to form a plurality of additional half-bridge circuits, wherein, in use, said first half-bridge circuit and said additional half-bridge circuits, in combination, produce substantially periodic signals phase shifted with respect to one another to facilitate production of responsive frequency multiplied outputs in quadrature, wherein at least the said first, second, third and fourth magnetoresistive sensor elements are positioned in the magnetoresistive sensor array to minimize the effect of differences in temperature between magnetoresistive sensor elements in the first and second pairs.

24. The magnetoresistive sensor array in claim 23, wherein the first and second magnetoresistive sensor elements are separated in the magnetoresistive sensor array by substantially 1.5λ or less.

25. The magnetoresistive sensor array in claim 23, wherein the first and second magnetoresistive elements are spaced apart by (2n−1)λ where n is a positive integer.

26. The magnetoresistive sensor array in claim 23, wherein magnetoresistive sensor elements in at least the first quarter-bridge are placed in close proximity to one another so as to minimize the effect of a temperature difference across said first quarter-bridge.

27. A sensor array as in claim 23 further including a frequency multiplier coupled to said elements for multiplying the output frequency of said array.

28. A sensor array as in claim 27 wherein said frequency multiplier mutliplies said output frequency while maintaining said output in quadrature.

29. A method of configuring a plurality of magnetoresistive elements in a frequency doubling magnetoresistive sensor that moves relative to a series of alternating north and south magnetic poles on a single track where adjacent north and south poles are separated by pitch λ, comprising the steps of:

providing a first group of magnetoresistive elements and a second group of magnetoresistive elements with successive magnetoresistive elements in each group being separated by (n+½)λ, where n=0, ±1, ±3, ±5, . . . ;

connecting ones of the magnetoresistive elements from the first group to corresponding magnetoresistive elements from the second group to form corresponding half-bridges, each half-bridge having a first magnetoresistive element from the first group and a second magnetoresistive element from the second group;

generating at a node in each half-bridge located between the first and second magnetoresistive element an output signal;

separating the first magnetoresistive sensor of a first half-bridge from the first magnetoresistive sensor of a second half-bridge by (n+⅜)λ;

separating the first magnetoresistive sensor of a third half-bridge from the first magnetoresistive sensor of the second half-bridge by (n+3/8)λ and from the first magnetoresistive sensor of the first half-bridge by (n+(2)*3/8)λ;

separating the first magnetoresistive sensor of a fourth half-bridge from the first magnetoresistive sensor of the third half-bridge by (n+3/8)λ, from the first magnetoresistive sensor of the second half-bridge by (n+(2)*3/8)λ, and from the magnetoresistive sensor of the first half-bridge by (n+(3)*3/8)λ;

separating the second magnetoresistive sensor element of each half-bridge from the corresponding first magnetoresistive sensor element by (n+½)λ; and connecting complementary magnetoresistive sensor elements to the first and second magnetoresistive sensor elements of one or more of the half-bridges to form first and second complementary magnetoresistive pairs in each of the one or more half-bridges, the magnetoresistive sensor elements in each pair being separated by (2n+1)λ, wherein electrical connection of complementary magnetoresistive elements compensates for asymmetries in magnetic field detected by each magnetoresistive element that cause output signal jitter.

30. The method in claim 26, further comprising:

placing sensor elements in each half-bridge in close proximity to minimize an effect of a temperature difference across each half-bridge.

31. A magnetoresistive sensor for detecting the changing magnetic fields generated by relative motion between said sensor and a magnetic source incrementally magnetized with alternating north and south poles separated by the substantially uniform pitch λ, said sensor comprising:

a magnetoresistive element array including plural pairs of magnetoresistive elements, wherein at least a first pair of said magnetoresistive elements are separated substantially by a spacing of nλ, where n is an odd integer;

electrical conductors electrically connecting the plural pairs of magnetoresistive elements within the array to form a plurality of half-bridge circuits, each half-bridge circuit including plural quarter-bridge circuits, wherein said first pair of magnetoresistive elements are electrically connected together within the same quarter-bridge circuit;

wherein, in use, said plurality of half-bridge circuits produce plural substantially periodic signals phase shifted such that at least one of said plural periodic signals is not at 90°, 180° or 270° electrical with respect to all the other plural periodic signals.

32. The magnetoresistive sensor of claim 31 wherein, in use, said first pair of magnetoresistive elements are electrically connected in series.

33. The magnetoresistive sensor of claim 31 wherein, in use, said first pair of magnetoresistive elements are electrically connected in parallel.

34. The magnetoresistive sensor of claim 31 wherein, in use, said plurality of half-bridge circuits are electrically connected to provide at least a pair of substantially periodic output signals in quadrature.

35. The magnetoresistive sensor of claim 31 wherein, in use, said plurality of half-bridge circuits are electrically connected to provide substantially periodic output signals having a predetermined phase relationship such that when said substantially periodic output signals are electronically combined, frequency multiplied further output signals in quadrature are produced.

36. The magnetoresistive sensor of claim 31 wherein said periodic signals are substantially sinusoidal.

37. The magnetoresistive sensor of claim 31 wherein said magnetoresistive elements are disposed on a common substrate.

38. The magnetoresistive sensor of claim 31 wherein said magnetoresistive elements are disposed on a common support structure.

39. The magnetoresistive sensor of claim 31 wherein, in use, any two of said periodic signals are phase shifted by substantially 45°.

40. A magnetoresistive sensor for detecting the changing magnetic fields generated by relative motion between said sensor and a magnetic source incrementally magnetized with alternating north and south magnetic poles spaced apart by a pitch λ, said sensor comprising:

a magnetoresistive element array including plural pairs of magnetoresistive elements disposed on a support structure and electrically connected so as to compensate for the asymmetric response of the magnetoresistive elements in said plural pairs to said north and south magnetic poles, wherein each pair of said magnetoresistive elements is separated substantially by a spacing of nλ, where n is an odd integer; and wherein said array has sufficient pairs of magnetoresistive elements disposed and electrically connected so as to substantially compensate for differences in the spacing between magnetic poles on said magnetic source, said sensor further comprising electrical conductors electrically connecting each pair of said magnetoresistive elements to form a plurality of quarter-bridge circuits, and further electrical conductors further electrically connecting at least some of said plural quarter-bridge circuits to form a plurality of half-bridge circuits producing a corresponding plurality of substantially periodic signals phase shifted such that at least one of said plural signals is not at 90°, 180° or 270° electrical with respect to all other ones of the plural signals.

41. The magnetoresistive sensor of claim 40 wherein, in use, at least one of said plural pairs of magnetoresistive elements is electrically connected in series.

42. The magnetoresistive sensor of claim 40 wherein, in use, at least one of said plural pairs of magnetoresistive elements is electrically connected in parallel.

43. The magnetoresistive sensor of claim 40 wherein, in use, said sensor provides at least a pair of substantially periodic output signals in quadrature.

44. The magnetoresistive sensor of claim 43 wherein said periodic signals are substantially sinusoidal.

45. The magnetoresistive sensor of claim 40 wherein, in use, said sensor provides substantially periodic output signals having a predetermined phase relationship such that when said substantially periodic output signals are electronically conditioned and combined, further frequency multiplied output signals in quadrature are produced.

46. The magnetoresistive sensor of claim 45 wherein said periodic signals are substantially sinusoidal.

47. The magnetoresistive sensor of claim 45 wherein, in use, any two of said periodic signals are phase shifted by substantially 45°.

48. The magnetoresistive sensor of claim 40 wherein said magnetoresistive elements are disposed on a common substrate.

49. The magnetoresistive sensor of claim 40 wherein said magnetoresistive elements are disposed on a common support structure.

50. A sensor array as in claim 40 further including a frequency multiplier coupled to said elements for multiplying the output frequency of said array.

51. A sensor array as in claim 50 wherein said frequency multiplier multiplies said output frequency while maintaining said output in quadrature.

52. An encoder for monitoring the relative motion between a magnetoresistive sensor and a magnetic source incrementally magnetized with alternating north and south magnetic poles separater by a substantially uniform pitch λ, said encoder including a support structure that supports said sensor and provides for magnetic coupling of said sensor with said magnetic source while permitting relative motion between said sensor and said magnetic source, said sensor comprising:

an array of magnetoresistive elements including plural pairs of magnetoresistive elements, wherein at least a first pair of said magnetoresistive elements are separated substantially by a spacing of nλ, where n is an odd integer; and electrical conductors electrically connecting the plural pairs of magnetoresistive elements to form a plurality of half-bridge circuits producing a corresponding plurality of substantially periodic signals phase shifted such that at least one of said plural signals is not at 90°, 180°, or 270° electrical with respect to all other ones of the plural signals, each half-bridge circuit further comprising a plurality of quarter-bridge circuits wherein said electrical conductors electrically connect said first pair of magnetoresistive elements within the same quarter-bridge circuit to thereby compensate for differences in the response characteristic of said magnetoresistive elements to said north and south magnetic poles.

53. The encoder of claim 51 wherein said magnetic source is adapted to be mounted to a shaft for rotation therewith and includes a substantially round periphery having said alternating north and south poles magnetized thereon; and said magnetoresistive sensor is electrically connected to electronic circuitry capable of providing at least a pair of output signals in quadrature and proportional to the rotational velocity of said shaft.

54. A process for manufacturing a magnetoresistive sensor for detecting changing magnetic fields generated by relative motion between said sensor and a magnetic source that is incrementally magnetized with alternating north and south poles separated by the substantially uniform pitch λ, said process comprising:

disposing an array of magnetoresistive elements onto a substrate, including the step of spacing at least a pair of said magnetoresistive elements substantially by a spacing of nλ, where n is an odd integer; and electrically connecting the magnetoresistive elements within the array to form plural half-bridge circuits each comprising plural quarter-bridge circuits, said plural half-bridge circuits, in use, producing plural substantially periodic signals that are phase shifted such that at least one of said plural periodic signals is not at 90°, 180° or 270° electrical with respect to all other of said plural periodic signals, said electrically connecting step including the step of connecting said pair of magnetoresistive elements within the same one of said plural quarter bridge circuits.

55. The process of claim 54 wherein said electrically connecting step includes connecting said pair of magnetoresistive elements in series.

56. The process of claim 54 wherein said electrically connecting step includes connecting said pair of magnetoresistive elements in parallel.

* * * * *